United States Patent
Michels

(10) Patent No.: US 7,784,702 B2
(45) Date of Patent: Aug. 31, 2010

(54) FAMILY CODE DETERMINATION USING BRAND AND SUB-BRAND

(76) Inventor: Jane Michels, 2911 Tapps Turn, Bloomington, IN (US) 47401

( * ) Notice: Subject to any disclaimer, the term of this patent is extended or adjusted under 35 U.S.C. 154(b) by 166 days.

(21) Appl. No.: 11/763,428

(22) Filed: Jun. 14, 2007

(65) Prior Publication Data

US 2008/0041950 A1 Feb. 21, 2008

Related U.S. Application Data

(60) Provisional application No. 60/813,506, filed on Jun. 14, 2006.

(51) Int. Cl.
*G06K 19/06* (2006.01)

(52) U.S. Cl. .................. 235/494; 235/375; 235/462.01; 235/487; 705/14.1

(58) Field of Classification Search .................. 235/375, 235/462.01, 487, 494; 705/14.1
See application file for complete search history.

(56) References Cited

U.S. PATENT DOCUMENTS

| 4,910,672 | A | 3/1990 | Off et al. |
| 5,256,863 | A | 10/1993 | Ferguson et al. |
| 5,710,886 | A | 1/1998 | Christensen et al. |
| 6,026,377 | A * | 2/2000 | Burke ........................... 705/27 |
| 2002/0046107 | A1 | 4/2002 | Marshall et al. |
| 2004/0059634 | A1* | 3/2004 | Tami et al. ..................... 705/17 |
| 2004/0193487 | A1* | 9/2004 | Purcell et al. ................. 705/14 |
| 2005/0182695 | A1 | 8/2005 | Lubow et al. |
| 2005/0240478 | A1 | 10/2005 | Lubow et al. |
| 2006/0122905 | A1 | 6/2006 | Marshall et al. |
| 2006/0173749 | A1* | 8/2006 | Ward et al. .................... 705/26 |

OTHER PUBLICATIONS

GS1 BarCodes and eCom 2009.*

* cited by examiner

*Primary Examiner*—Daniel A Hess
*Assistant Examiner*—Ali Sharifzada
(74) *Attorney, Agent, or Firm*—Hickman Palermo Truong & Becker LLP

(57) ABSTRACT

Methods, computer program products, systems and data structures for generating a bar code are described. The bar code may include a first bar code and a second bar code. The first bar code includes a first number system character, a GS1 company prefix, a family code, a value code and a check digit, and the second bar code includes a second number system character and an application identifier. The family code of the first bar code, in some implementations, may be generated based on brand and/or sub-brand of associated products.

27 Claims, 22 Drawing Sheets

500

```
┌─────────────────────────────────────┐
│    Receiving A Bar Code Request     │
│               502                   │
└─────────────────────────────────────┘
                  │
                  ▼
┌─────────────────────────────────────┐
│ Determine One or More Bar Code Parameters │
│               504                   │
└─────────────────────────────────────┘
                  │
                  ▼
┌─────────────────────────────────────┐
│  Generate Bar Code Based On The One Or │
│          More Parameters            │
│               506                   │
└─────────────────────────────────────┘
```

FIG. 5A

Manufacturer Coupon Creation

Corporation Brands

Company Prefix 012345

- ☐ Brand Alex
- ☐ Brand Betty
- ☐ Brand Charles
- ☐ Unknown

Company Prefix 712345

- ☐ Brand John
- ☐ Brand Jim
- ☐ Brand Jeff

Manufacturer Coupon Creation

Corporation Brands

Company Prefix 012345

- ☐ Brand Alex — 704
  - ☐ Alex Light
  - 706 ☐ Alex Ultra
  - ☐ Alex Supreme
  - ☐ Alex Thin Crust

- ☐ Brand Betty

- ☐ Brand Charles
  - ☐ Charles Pizza
  - ☐ Charles Pizza Rolls
  - ☐ Charles Desserts

- ☐ Unknown

Company Prefix 712345

- ☐ Brand John

- ☐ Brand Jim

- ☐ Brand Jeff

FIG. 7B

Manufacturer Coupon Creation ⌐720

Company Prefix 012345

| | | | | |
|---|---|---|---|---|
| ⊟ ☐ | Brand Alex | ⌐722 | ⌐724 | ⌐726 ⌐728 |
| ⊟ | Alex Light | | | |
| 721a→ ☐ | 012545 00011 | Turkey Pepperoni Pizza | 12 oz | 211 |
| 721b→ ☐ | 012345 00012 | Vegetarian Pizza | 12 oz | 211 |
| 721c→ ☐ | 012345 00013 | Cheese Pizza | 12 oz | 211 |
| 721d→ ☐ | 012345 00015 | BBQ Chicken Pizza | 12 oz | 211 |
| ⊟ | Alex Ultra | | | |
| ☐ | 012345 00035 | Tomato & Basil Pizza | 15 oz | 212 |
| ☐ | 012345 00534 | Ham & Pineapple Pizza | 15.25 oz | 212 |
| ⊟ | Alex Supreme | | | |
| ☐ | 012345 53521 | Deluxe Pizza | 16.5 oz | 213 |
| ☐ | 012345 00454 | Meat Lovers Pizza | 16.75 oz | 213 |
| ⊟ | Alex Thin Crust | | | |
| ☐ | 012345 66521 | Pepperoni Pizza | 14 oz | 214 |
| ☐ | 012345 05487 | Sausage Pizza | 14 oz | 214 |
| ☐ | 012345 54244 | Cheese Pizza | 14 oz | 214 |
| ☐ | 012345 65245 | Pepperoni Sausage Pizza | 14 oz | 214 |
| ⊞ ☐ | Brand Betty | | | |
| ⊟ ☐ | Brand Charles | | | |
| ⊟ | Charles / Pizza | | | |
| ☐ | 012345 00368 | Pepperoni Pizza | 14.5 oz | 221 |
| ☐ | 012345 00468 | Sausage Pizza | 14.5 oz | 221 |
| ☐ | 012345 05046 | Cheese Pizza | 14.25 oz | 221 |
| ⊞ | Charles / Pizza Rolls | | | |
| ⊞ | Charles / Desserts | | | |
| ⊞ ☐ | Unknown | | | |

Company Prefix 712345

⊞ ☐     Brand John

⊞ ☐     Brand Jim

⊞ ☐     Brand Jeff

FIG. 7C

Manufacturer Coupon Creation

Company Prefix 012345

- ☐ Brand Alex
  - Alex Light
    - ☑ 012545 00011  Turkey Pepperoni Pizza  12 oz  211
    - ☑ 012345 00012  Vegetarian Pizza  12 oz  211
    - ☑ 012345 00013  Cheese Pizza  12 oz  211
    - ☑ 012345 00015  BBQ Chicken Pizza  12 oz  211
  - Alex Ultra
    - ☑ 012345 00035  Tomato & Basil Pizza  15 oz  212
    - ☑ 012345 00534  Ham & Pineapple Pizza  15.25 oz  212
  - Alex Supreme
    - ☑ 012345 53521  Deluxe Pizza  16.5 oz  213
    - ☑ 012345 00454  Meat Lovers Pizza  16.75 oz  213
  - Alex Thin Crust
    - ☐ 012345 66521  Pepperoni Pizza  14 oz  214
    - ☐ 012345 05487  Sausage Pizza  14 oz  214
    - ☐ 012345 54244  Cheese Pizza  14 oz  214
    - ☐ 012345 65245  Pepperoni Sausage Pizza  14 oz  214

- ☐ Brand Charles
  - Charles Pizza
    - ☑ 012345 00368  Pepperoni Pizza  14.5 oz  221
    - ☑ 012345 00468  Sausage Pizza  14.5 oz  221
    - ☑ 012345 05046  Cheese Pizza  14.25 oz  221

[ Suggest Family Code ]   [ Outside Summary Code ]

FIG. 8A

Manufacturer Coupon Creation

Company Prefix 012345

- ☐ Brand Alex
  - ⊟ Alex Light
    - ☑ 012545 00011    Turkey Pepperoni Pizza        12 oz        211
    - ☑ 012345 00012    Vegetarian Pizza              12 oz        211
    - ☑ 012345 00013    Cheese Pizza                  12 oz        211
    - ☑ 012345 00015    BBQ Chicken Pizza             12 oz        211
  - ⊟ Alex Ultra
    - ☑ 012345 00035    Tomato & Basil Pizza          15 oz        212
    - ☑ 012345 00534    Ham & Pineapple Pizza         15.25 oz     212
  - ⊟ Alex Supreme
    - ☑ 012345 53521    Deluxe Pizza                  16.5 oz      213
    - ☑ 012345 00454    Meat Lovers Pizza             16.75 oz     213
  - ⊟ Alex Thin Crust
    - ☐ 012345 66521    Pepperoni Pizza               14 oz        214
    - ☐ 012345 05487    Sausage Pizza                 14 oz        214
    - ☐ 012345 54244    Cheese Pizza                  14 oz        214
    - ☐ 012345 65245    Pepperoni Sausage Pizza       14 oz        214

- ☐ Brand Charles
  - ⊟ Charles Pizza
    - ☑ 012345 00368    Pepperoni Pizza               14.5 oz      221
    - ☑ 012345 00468    Sausage Pizza                 14.5 oz      221
    - ☑ 012345 05046    Cheese Pizza                  14.25 oz     221

Suggest Family Code: 200

FIG. 8B

Manufacturer Coupon Creation

<u>Company Prefix 012345</u>

- ☐ Brand Alex
  - Alex Light
    - ☑ 012545 00011   Turkey Pepperoni Pizza    12 oz    211
    - ☑ 012345 00012   Vegetarian Pizza    12 oz    211
    - ☑ 012345 00013   Cheese Pizza    12 oz    211
    - ☑ 012345 00015   BBQ Chicken Pizza    12 oz    211
  - Alex Ultra
    - ☑ 012345 00035   Tomato & Basil Pizza    15 oz    212
    - ☑ 012345 00534   Ham & Pineapple Pizza    15.25 oz    212
  - Alex Supreme
    - ☑ 012345 53521   Deluxe Pizza    16.5 oz    213
    - ☑ 012345 00454   Meat Lovers Pizza    16.75 oz    213
  - Alex Thin Crust
    - ☐ 012345 66521   Pepperoni Pizza    14 oz    214
    - ☐ 012345 05487   Sausage Pizza    14 oz    214
    - ☐ 012345 54244   Cheese Pizza    14 oz    214
    - ☐ 012345 65245   Pepperoni Sausage Pizza    14 oz    214

- ☐ Brand Charles
  - Charles Pizza
    - ☐ 012345 00368   Pepperoni Pizza    14.5 oz    221
    - ☐ 012345 00468   Sausage Pizza    14.5 oz    221
    - ☐ 012345 05046   Cheese Pizza    14.25 oz    221

[ Suggest Family Code ]    [ Outside Summary Code ]

FIG. 8C

Manufacturer Coupon Creation

Company Prefix 012345

- ☐ Brand Alex
  - Alex Light
    - ☑ 012545 00011    Turkey Pepperoni Pizza    12 oz    211
    - ☑ 012345 00012    Vegetarian Pizza    12 oz    211
    - ☑ 012345 00013    Cheese Pizza    12 oz    211
    - ☑ 012345 00015    BBQ Chicken Pizza    12 oz    211
  - Alex Ultra
    - ☑ 012345 00035    Tomato & Basil Pizza    15 oz    212
    - ☑ 012345 00534    Ham & Pineapple Pizza    15.25 oz    212
  - Alex Supreme
    - ☑ 012345 53521    Deluxe Pizza    16.5 oz    213
    - ☑ 012345 00454    Meat Lovers Pizza    16.75 oz    213
  - Alex Thin Crust
    - ☐ 012345 66521    Pepperoni Pizza    14 oz    214
    - ☐ 012345 05487    Sausage Pizza    14 oz    214
    - ☐ 012345 54244    Cheese Pizza    14 oz    214
    - ☐ 012345 65245    Pepperoni Sausage Pizza    14 oz    214

- ☐ Brand Charles
  - Charles Pizza
    - ☐ 012345 00368    Pepperoni Pizza    14.5 oz    221
    - ☐ 012345 00468    Sausage Pizza    14.5 oz    221
    - ☐ 012345 05046    Cheese Pizza    14.25 oz    221

Suggest Family Code: 210

FIG. 8D

Manufacturer Coupon Creation

Company Prefix 012345

☑ Brand Alex
    ⊟ Alex Light
        ☑ 012545 00011    Turkey Pepperoni Pizza    12 oz    211
        ☑ 012345 00012    Vegetarian Pizza    12 oz    211
        ☑ 012345 00013    Cheese Pizza    12 oz    211
        ☑ 012345 00015    BBQ Chicken Pizza    12 oz    211
    ⊟ Alex Ultra
        ☑ 012345 00035    Tomato & Basil Pizza    15 oz    212
        ☑ 012345 00534    Ham & Pineapple Pizza    15.25 oz    212
    ⊟ Alex Supreme
        ☑ 012345 53521    Deluxe Pizza    16.5 oz    213
        ☑ 012345 00454    Meat Lovers Pizza    16.75 oz    213
    ⊟ Alex Thin Crust
        ☑ 012345 66521    Pepperoni Pizza    14 oz    214
        ☑ 012345 05487    Sausage Pizza    14 oz    214
        ☑ 012345 54244    Cheese Pizza    14 oz    214
        ☑ 012345 65245    Pepperoni Sausage Pizza    14 oz    214

☑ Brand Charles
    ⊟ Charles Pizza
        ☑ 012345 00368    Pepperoni Pizza    14.5 oz    221
        ☑ 012345 00468    Sausage Pizza    14.5 oz    221
        ☑ 012345 05046    Cheese Pizza    14.25 oz    221

[ Suggest Family Code ]    [ Outside Summary Code ] — 804
                                    806

FIG. 8E

Manufacturer Coupon Creation

Company Prefix 012345  ⌠810

Items that Cannot be purchased using a Super Summary Code of 200

Charles Desserts
| | | | |
|---|---|---|---|
| ☑ 012345 77542 | Tiramisu | 13 oz | 321 |
| ☑ 012345 78588 | Chocolate Cake | 16 oz | 322 |
| ☑ 012345 75584 | Cherry Pie | 15 oz | 323 |
| ☑ 012345 78545 | Vanilla Cake | 16 oz | 322 |

FAMILY CODE DETERMINATION USING BRAND AND SUB-BRAND

RELATED APPLICATION

This application claims the benefit of priority from U.S. Provisional Patent Application No. 60/813,506, entitled "Creation of Bar Code Numbers by Brand and/or Item UPC(s)," filed Jun. 14, 2006, which provisional application is incorporated by reference herein in its entirety.

TECHNICAL FIELD

The subject matter of this application is generally related to coupon creation and distribution.

BACKGROUND

Manufacturers, suppliers and service providers frequently issue discount coupons to attract and encourage potential consumers to purchase products and services (hereinafter collectively referred to as products). One objective of coupon issuance is to stimulate sales and boost revenue by drawing consumers to purchase specific products, and particularly, newly introduced products.

Conventionally, coupons can be distributed to consumers through mail, magazines, newspapers and other publications, and electronically through the Internet, and redeemed at local stores and retailers. Regardless of the delivery mechanism, a coupon traditionally contains transactional data such as product information, coupon value, expiration data, and other restrictions. These data are can be encoded in the form of a bar code that collectively identifies the coupon. However, the procedures for encoding a bar code can be difficult. Information to be printed on the Version A bar code can be divided into a number of fields such as a Number System Character, Company Prefix, Family Code, Value code and Check Digit. The Extended Bar Code (UCC/EAN-128) may consist of Number System Character of the Company Prefix, Offer Code Number, Household ID and expiration date. The layout of the fields is determined by selecting a bar code format. Once the bar code format is selected, data can be entered for each of the fields. Often the fields have input restrictions that limit the type and amount of characters that may be included in the bar code. Correct coding can be labor and cost intensive.

Errors in coding can resulting increased manufacturer costs. For example, if the family code of a bar code on a coupon is mistakenly entered with incorrect data, the manufacturer associated with the coupon can be severely penalized by the retailers. As an example, a coupon may textually specify that the coupon is "good on any Brand X Silver vitamin", while the family bar code of the coupon is coded only for "Brand X Regular vitamin". When the coupon is presented for "Brand X Silver vitamin", a transaction error may be triggered which prevents the coupon from being redeemed because a qualifying product has not been purchased. This can create confusion between the consumers and the retailers, and unavoidably delays product checkout process.

SUMMARY

A maintain data base system may include a bar code module having a bar code creation manager for creating bar codes. The bar code creation manager may suggest a family code based on brands and/or sub-brands associated with products. The user may review the proposed family code to determine whether the desired product or family of products is covered by the proposed family code. Should the user accept the proposed family code, the family code may be recorded for the specified brand and associated products.

In one implementation, a method for generating a bar code includes: receiving a request to generate a suggested family code for one or more products; determining a brand associated with each product; generating the suggested family code based on the brand; and generating a bar code symbol based on the suggested family code.

In another implementation, a method for generating a bar code includes: selecting a brand; identifying one or more products associated with the brand; determining a suggested family code that classifies the identified products; and generating a bar code symbol based on the suggested family code.

In yet another implementation, a system for generating a bar code includes: a processor; a computer-readable medium operatively coupled to the processor and including instructions, which, when executed by the processor, causes the processor to perform operations comprising: receiving a request to generate a suggested family code for one or more products; determining a brand associated with each product; generating the suggested family code based on the brand; and generating a bar code symbol based on the suggested family code.

In yet another implementation, a computer-readable medium having instructions stored thereon, which, when executed by a processor, causes the processor to perform operations that includes: receiving a request to generate a suggested family code for one or more products; determining a brand associated with each product; generating the suggested family code based on the brand; and generating a bar code symbol based on the suggested family code.

In yet another implementation, a system for generating bar codes includes: means for receiving a request to generate a suggested family code for one or more products; means for determining a brand associated with each product; means for generating the suggested family code based on the brand; and means for generating a bar code symbol based on the suggested family code.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5A is a flow diagram showing an example of a bar code creation process.

FIGS. 7A-7C are example listings showing brands and sub-brands that can be accessed by an authorized user.

FIGS. 8A-8F are example screen shots showing a process for generating a suggested family code and a list of ineligible products that cannot be used with the suggested family code.

Like reference symbols in the various drawings indicate like elements.

DETAILED DESCRIPTION

System Overview

A data distribution system can be used for generating, storing, retrieving and manipulating coupon data. In some implementations, the data distribution system described herein includes internal logic to handle such tasks, and one or more databases or database servers configured to facilitate the organization and management of coupons and coupon distribution. For example, the data distribution system can include a coupon database server (as will be discussed in greater detail below) in which one or more application programs executing on clients and/or servers can send messages and data to a coupon database server in a predefined format for managing coupon creation and distribution. Generally, coupons can include certificates (e.g., cents-off, percent discount, etc.), cash values, vouchers for a discount and the like.

Although these implementations are presented in the form of a database distribution system, it should be understood that the teachings herein may be applied more generally to any management system, including or in addition to management systems involving data distribution.

Figure 1:
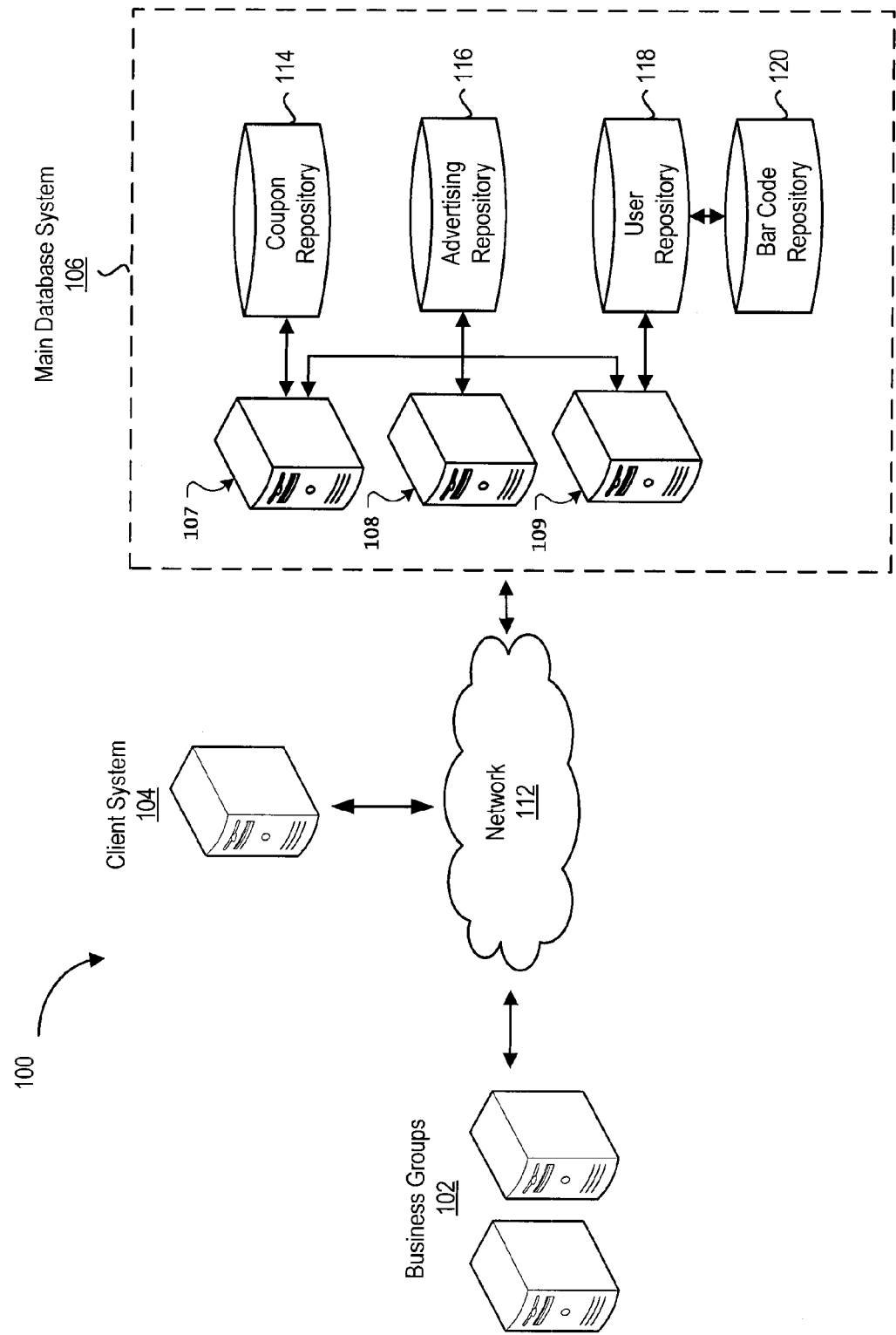
FIG. 1 shows an example of a data distribution system.

FIG. 1 shows an example of a data distribution system 100. Referring to FIG. 1, the data distribution system 100 generally includes business groups 102. The term "business groups" used herein may encompass essentially any business that provides a product or service, including businesses serving the public, the government, business-to-business and the like. As an example, business groups 102 may include manufacturers, suppliers, service providers, contractors, advertisers and the like. The data distribution system 100 also includes a client system 104, and a main database system 104 that is remote from the client system 104. Though a client and server configuration is shown, other architectures are possible.

The business groups 102, the client system 104 and the main database system 106 can be connected by a network 112. The network 112 can facilitate wireless or landline communication between each entity. The network 112 may be all or a portion of an enterprise or secured network. While illustrated as single network, the network 112 may be a continuous network logically divided into various sub-nets or virtual networks without departing from the scope of this disclosure, so long as at least portion of the network 112 may facilitate communications and exchanges of coupons and/or coupon data between the business groups 102, the client system 104 and the main database system 106.

In some implementations, the network 112 encompasses any internal or external network, networks, sub-network, or combination thereof operable to facilitate communications between various computing components in system 100. The network 112 may communicate, for example, Internet Protocol (IP) packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANs), wide area networks (WANs), all or a portion of the global computer network known as the Internet, and/or any other communication system or systems at one or more locations.

Main Database System

The main database system 106, which facilitates the generation and distribution of coupons, can include various servers such as database servers, application servers and/or other software/hardware components. In some implementations, the database servers, application servers and/or software/hardware components of the main database system 106 can be configured to be connected to, or otherwise receive coupon information from, the business groups 102. This function may be performed by a direct electronic connection with the business groups 102, or may involve loading data from a physically transportable data storage medium (e.g., diskette, tape, CD-ROM, etc.). The business groups 102 can issue an associated set of instructions that define how each coupon is to be distributed. For example, such instructions can include restrictions as to a number of coupons that any one user may print out for redemption, or guidelines that only users belonging to a particular demographic group or residing in a geographic location can access a selected group of coupons.

Further, these database servers, application servers and/or software/hardware components of the main database system 106 can be configured to receive other information (e.g., advertising information) from the business groups 102. Similar to receiving coupon information, this function can be performed by direct electronic connection with the a sponsors' systems, or may involve loading data from a physically transportable data storage medium (i.e., diskette, tape, CD-ROM, etc.). In some instances, when a user prints out a coupon, one or more other forms of information (e.g., advertising impressions) can be displayed on the printed coupon.

Business groups 102 may register with the main database system 106 to establish a coupon program. In one implementation, registration includes downloading and executing an executable program that facilitates the electronic communication between the main database system 106 and the business groups 102. Once registered, the main database system 106 may receive coupon data such as, without limitation, an identification of a product, a discount or coupon value for the product, a bar code of the product, and expiration data from the business groups 102.

Example Database Servers and Repositories

As illustrated in FIG. 1, the main database system 106 can include a coupon server 107 coupled to a coupon repository 114 for storing coupons and coupon data, an advertising server 108 coupled to an advertising repository 116 for generating and storing advertising information associated with one or more coupons, and a user server 109 coupled to an user repository 118 for tracking and recording user transaction history. Each server 107-109 can include one or more physical, individual general purpose computing systems, which can be arranged in a cluster environment. In these implementations, additional computing systems also may be added to provide for load balancing (e.g., scalability, and the ability to quickly add additional hardware as load and responsiveness criteria require). Each server also can be configured to operate using SQL server software, such as Microsoft SQL Server®, commercially available from Microsoft Corporation of Redmond, Wash. In alternative implementations, the functions of plural servers can be performed by a single server device.

Figure 3A:
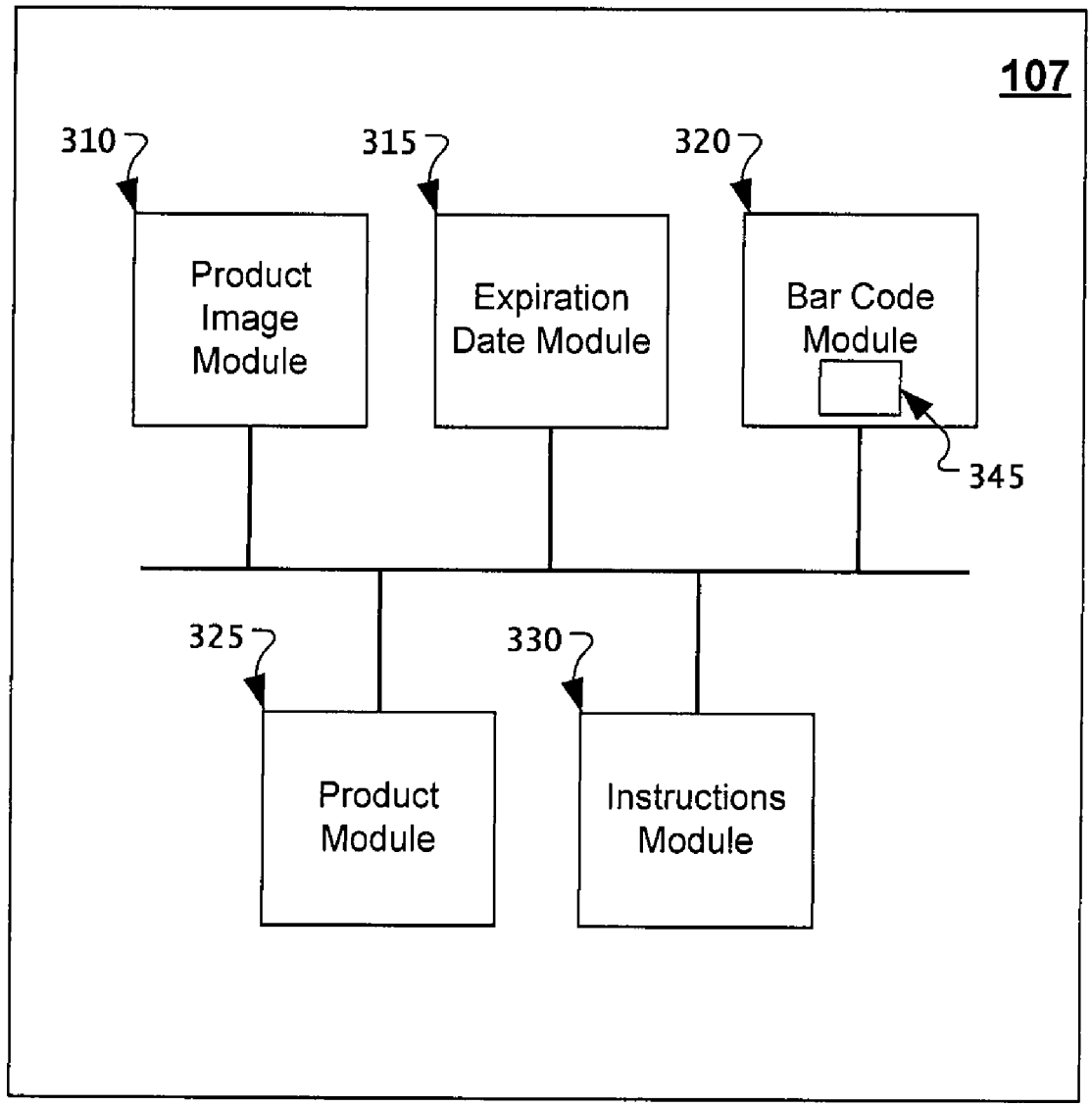
FIG. 3A shows examples of components of a coupon database server.

The coupon server 107 can facilitate the generation of coupons based on coupon data received from the business groups 102. FIG. 3 shows example components of the coupon server 107. Referring to FIG. 3A, the coupon server 107 includes: a product image module 310 for displaying/generating/removing/updating a product image; an expiration date module 315 for receiving and displaying expiration data from the business groups 102; a bar code module 320 including a bar code creation manager 345 to facilitate the creation of a bar code that identifies a product; a product module 325 for setting forth product information (e.g., coupon values, applicable items and the like); and an instructions module 330 for imprinting rules, policies and instructions associated with the usage of the coupon.

Figure 3B:
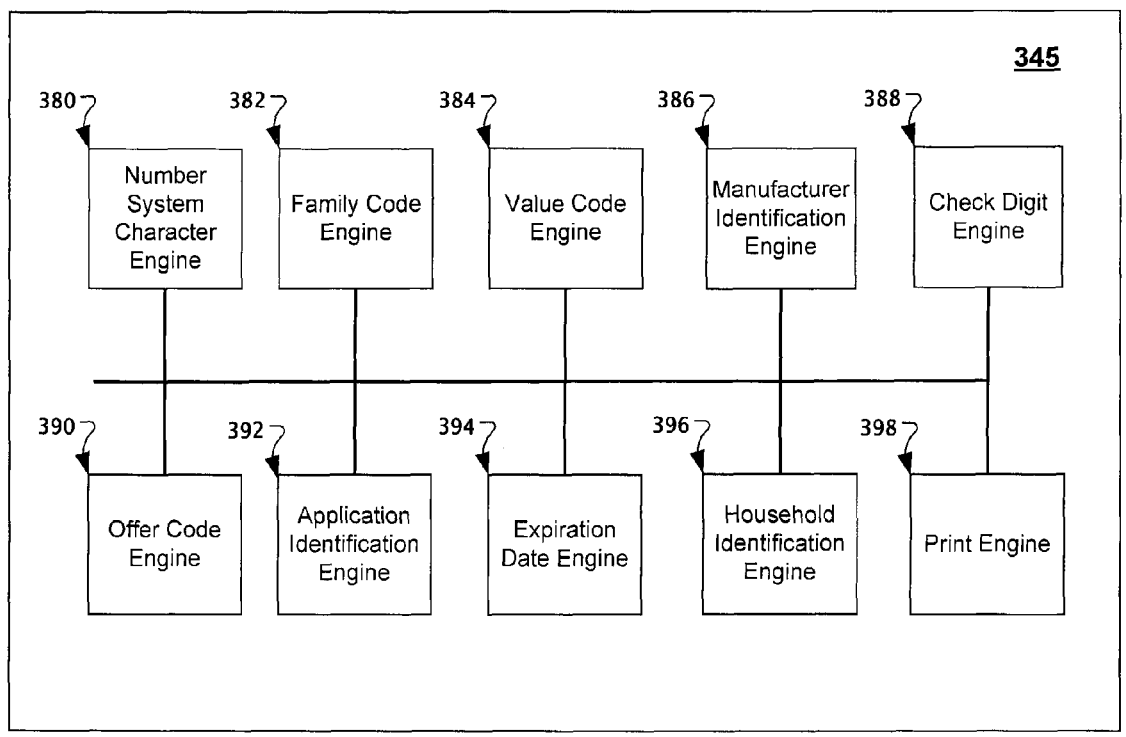
FIG. 3B shows examples of components of a bar code creation manager.

FIG. 3B shows example components of the bar code creation manager 345. As shown, the bar code creation manager 345 may be configured to receive one or more criteria or input from users, and generate one or more bar codes based on the criteria or input. The bar code creation manager 345 includes: a number system character engine 380 for determining a suitable number system character which identifies a bar code as a coupon bar code; a family code engine 382 for processing product codes received from users or generating family codes on behalf of the users based on products (e.g., brands or sub-brands) specified by the users for which bar codes are to be created; a value code engine 384 for determining a value code associated with a redemption value for which the coupon is valid; a manufacturer identification engine 386 for identifying a company prefix associated with a manufacturer from which a bar code request is received; a check digit engine 388 for calculating a check digit of a bar code based on, for example, a number system character, company prefix, family code and value code; an offer code engine 390 for generating or receiving (e.g., from a manufacturer) an offer code that identifies a type of offer being promoted by the coupon; an application identification engine 392 for producing, based on user information, an application identifier (e.g., a prefix code) used to identify the meaning and the format of the data that follows the application identifier; an expiration date engine 394 for inserting encoded expiration date on a bar code; a household identification engine 396 for determining an identification number an individual household or grouping; and a print engine 398 for printing bar codes created by the bar code creation manager 345.

Modules within the coupon database server 107 and engines within the bar code creation manager 345 can be communicatively coupled to one or more of each other. Though the modules and the engines identified above are described as being separate or distinct, one or more of the modules and one or more of the engines may be combined in a single process or routine. The functional description provided herein including separation of responsibility for distinct functions is merely by way of example. Other groupings or other divisions of functional responsibilities can be made as necessary or in accordance with design preferences.

Referring back to FIG. 1, coupons generated by the coupon server 107 as well as coupon data received from the business groups 102 may be stored in the coupon repository 114. The coupon repository 114 also may store information such as, without limitation, names of manufacturers, descriptions of products, coupon values, expiration dates and coupon identification numbers.

Client System

The client system 104 can be any system that uses or deploys software. The software can be a single application or an operating system, a collection of software applications or software components that perform various tasks in a larger system or application.

Similar to the main database system 106, the client system 104 can include one or more general purpose computing systems configured to operate in accordance with an operating system having a graphical user interface. The operating system can be, for example, MAC OS® by Apple, Inc. of Cupertino, Calif., a Microsoft Windows® operating system by Microsoft, Inc of Seattle, Wash., Linux operating system, a mobile operating system, control software and the like.

In some implementations, the network 112 can provide users with transparent, virtual access to applications, processes, and functions regardless of the physical location of the client system 104 where applications, processes, and functions reside. For example, a user desiring to obtain coupons can use the client system 104 to interact with the main database system 106 to obtain coupons, regardless of the physical location of the client system 104.

To provide communication between the main database system 106 and the client system 104, users of the client system 104 may be prompted by the main database system 106 to download and execute an executable program that will reside on the client system 104 for managing the handling and printing of coupons. In some implementations, the executable program can install a graphical user interface (GUI) on the client system 104. The GUI can be installed on the client system 104 at the time when a first communication is initiated with the main database system 106.

Alternatively, the GUI can be installed when a request for a coupon is received by the main database system 106. The GUI can include any hardware, software or combination thereof that allows a user to interact with the main database system 106. The GUI can include one or more user interface objects, such as display regions, tabs, buttons and the like. The interaction with the user interface can be performed by an actual user, a third party or another program, such as a program created using macro programming language that simulates the action of a user with respect to the user interface.

In some implementations, only authorized users can access the client system 104 for requesting and obtaining coupons. Once authenticated, the users may submit coupon requests and receive coupons as requested through the client system 104.

Coupon Structure

Based on coupon data received from the business groups 102, the main database system 106 can generate, maintain, and track coupons that can be electronically transmitted to users of the client system 104. The structural format of each coupon generally includes an identification of an offer type and an offer value of a product or service.

During operation, business groups 102 provide coupon data to the main database system 106. In response, the main database system 106 generates a coupon with the coupon data imprinted thereon. As discussed above, the coupon data can include information such as an identification of a product, a discount value, expiration data, and any other applicable terms and conditions. These information may be presented in the form of text, image, executable code, or any other media, content and the like.

Figure 2:
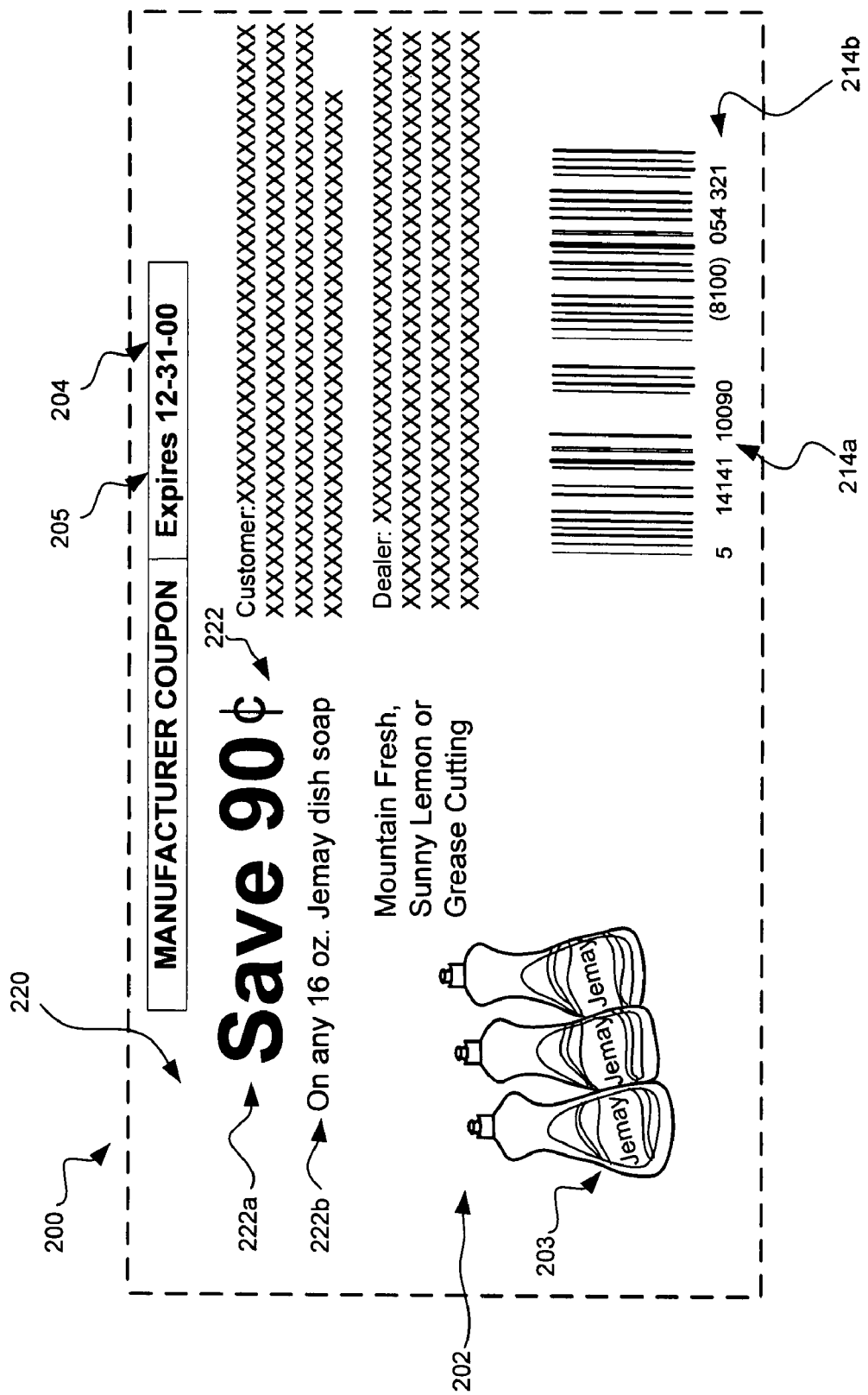
FIG. 2 shows an example of a coupon.

FIG. 2 shows an example coupon 200 with various intrinsic features. Such features may be specified by the main database system 106 and/or by the business groups 102. Referring to FIG. 2, the coupon 200 generally includes an image field 202 for displaying an image 203, an expiration field 204 for specifying an expiration date 205 on which the coupon 200 will be expired, and an offer field 220 which includes a text string 222 having a primary text field 222a and a secondary text field 222b. The primary text field 222a and the secondary text field 222b can collectively describe the type or coupon value of the coupon 200 when redeemed at a participating retailer.

The text string 222 may include a description pertaining to the coupon value (e.g., "Save $1.25") of the coupon 200, and applicable item(s) (e.g., water products). A description of the coupon value may be placed in the primary text field 222a, while a description of applicable item(s) may be placed in the secondary text field 222b. The coupon value in the primary text field 222a can be arranged adjacent to the description of the applicable item(s) in the secondary text field 222b. Alternatively, the coupon value can be positioned anywhere on the coupon 200 away from the description of the applicable item(s). In these implementations, the primary text field 222a may be utilized to accommodate additional information regarding a particular offer. For example, the additional information can include a coupon type that identifies the product as qualifying for a buy-one-get-one-free or two-for-the-price-of-one offer.

Generally, the coupon value of the coupon 200 can be expressed as a reduced price for the product (e.g., $2.99 after savings), a reduction in the price of the product (e.g., save $1.00) or a reduction in the overall transaction when multiple products are purchased (e.g., save $2.00 when you buy two or more). As shown, a consumer can use the coupon 200 to deduct $0.90 from the purchase of any "16 oz. Jemay dish soap" product.

The image field 202 can be utilized for visually and graphically identifying a product or service associated with the coupon 200. The image field 202 can be placed in the vicinity of the primary text field 222a or the secondary text field 222b, and can accommodate an image 203 of the product or service associated with the coupon 200. The image 203 can include an image portion and a text portion that supplements the product description in the primary text field 222a or the secondary text field 222b.

The image 203, the expiration date 205 and the text string 222 can be provided by the business groups 102. The presentation of these data and the inclusion or exclusion and placement of these data may vary from one coupon to another, and can be managed and controlled by the main database system 106. As an example, other than an image of a product, the main database system 106 may display, in the image field 202, images associated with a brand, a logo, a manufacturer, a service provider or a service provided by the service provider. As another example, the main database system 106 may display the expiration date 205 in the format of "Apr. 27, 2007", instead of "Apr. 27, 2007".

Bar Code Creation Manager

A specific brand or model of a product, or value of a coupon can be uniquely identified using a bar-coded identification number, with the identification number being quickly and easily read at the time of a transaction. Generally, bar codes are imprinted on products and coupons so that retailers and other redemption parties may validate the purchase of such products and deduct the overall cost of the purchase by the values encoded in the bar codes on the coupons.

In some implementations, the bar code creation manager 345 may be configured to create one or more bar codes on behalf of the business groups 102 in response to receiving one or more bar code requests. The bar code creation manager 345 may be configured to receive the bar code requests from users (e.g. business groups 102 such as manufacturer users) and generate bar codes consistent with one or more criteria specified in each bar code request. The bar code creation manager 345 also may be configured to verify POS readability, content and format of the generated bar code against conventional bar code guidelines, and record and store bar code histories for future tracking, reporting and retrieval.

The bar code creation manager 345 may allow authorized or registered users to maintain, correct and communicate internal family code structures for bar code encoding. Specifically, the main database system 106 may require the business groups 102 to establish a business account with the main database system 106 in order to submit a bar code request. To obtain a business account, a non-registered business group can enroll and register with the main database system 106 to acquire association or membership. Once registered, the non-registered business group becomes a registered business group, who may have access to an associated business account, and can login to the business account to specify the one or more criteria for generating a bar code. Each business group may have a set security level. The main database system 106 may assign an initial security level for each business group, which would allow a user of the business group (e.g., administrator) to assign other users of the same business group an access privilege (e.g., user identification, passwords, and security levels).

In some implementations, each registered business group has a company prefix assigned by the GS1 (formally known as the Uniform Code Council), which includes global GS1 member organizations and manages the GS1 System and Global Standards Management Process. In these implementations, the company prefix is integrated into each bar code generated by the bar code creation manager 345 in response to a bar code request.

Once registered, the corresponding business group may be provided with a user interface (not shown) by the main database system 106 through which the business groups 102 may specify one or more criteria for generating a bar code. In other implementations, the user interface may be downloaded in a form of client software that a business group 102 may execute to establish a communication between the business group 102 and the main database system 106 and to become an authorized user of the main database system 106. The business groups 102 may interact with the interface using a standard web browser. A browser is a client program which allows the business groups 102 and other users to access information or data stored on the coupon server 107 or user server 109 in the form of web pages. Examples of web browsers include Microsoft® Internet Explorer, Apple® Safari and Mozilla® Firefox.

The interface may include an administrative space, which can include various links and/or other user interface elements for allowing the business groups 102 to specify content to be embedded in a bar code. As an example, the interface may display existing family codes currently defined under a business account, as well as brands and sub-brands associated with the family codes to users. An authorized user may add additional family codes, or modify a product line so as to generate a new bar code for each product in the product line. As another example, the interface may enlist a series of products with unknown or unmatched family codes, or may alert the owner of the associated business account of any family codes that conflict with GS1 guidelines.

In some implementations, the bar code creation manager 345 may suggest family codes based on brands and/or sub-brands. A brand may be a common brand name, such as Frito-Lay®, L'Oreal®, Colgate®, or Coca-Cola®. Each brand may include a group of related products, referred to herein as sub-brands/categories. For example, "Brand X" may include "Brand X shampoo", "Brand X soap", "Brand X Light" and "Brand X Organic". By automatically assigning a family code based on a brand (or sub-brand/category) of a product, the necessity for experienced users and training on encoding bar codes is eliminated.

To assign a family code to a product based on a brand, a user may first specify a Company Prefix with the bar code creation manager 345 so as to verify that the user has the authority to generate new family code(s). Thereafter, a brand may be selected, and associated products (i.e., sub-brands/category) may be identified. For example, the user may specify "Brand Y" as the brand, and "Brand Y—Shampoo", "Brand Y—Conditioner" and "Brand Y—Styling Products" as associated products. In one implementation, if a brand encompasses one or more sub-brands/category, the one or more sub-brands also may be specified. For example, "Brand Y shampoo" may include a sub-brand of "Professional", "Organic", "For Men" and the like.

As will be discussed in greater detail in FIGS. 5C, 7A-7C and 8A-8F, once a brand and/or sub-brand is specified, the bar code creation manager 345 may suggest a suitable coupon family code for use on a coupon. For example, the bar code creation manager 345 may recommend "671" as the family code for "Brand X 12-ounce shampoo" and "678" as the family code for "Brand X 20-ounce shampoo". The user may review the proposed family codes to determine whether the desired product or family of products is covered by the proposed family code. Should the user accept the proposed family code, the family code may be recorded for the specified brand and associated products. Else, the user may manually override the proposed family code with a new family code.

As discussed above, the bar code creation manager 345 may be configured to receive a bar code request from a user. In some implementations, in response to the one or more criteria specified in a bar code request, the bar code creation manager 345 may generate a single digit identifier that identifies a bar code as a coupon bar code to the point-of-sale (POS) system, a five-digit identifier that conveys the identity of a manufacturer, a three-digit identifier that represents a product or a family of products for which the bar code is applicable, a two-digit identifier that indicates a redemption value associated the bar code, and a check digit that verifies the accuracy of the previous identifiers.

As shown in FIG. 2, the coupon 200 includes identification indicia such as a first bar code 214a and a second bar code 214b. Affixing a bar code to a coupon provides a machine-readable label, which may contain direct information about a product. Similarly, affixing a bar code to a product may serve as an index to a stored catalog or directory of products, which may as well contain information about other related products.

The bar code creation manager 345 may generate a first bar code 214a ("5-14141-10090-6"). The first bar code 214a may be a conventional universal product code (UPC) symbol which includes parallel lines, guard bars and bit patterns. The parallel lines and guard bars are generally sized and spatially arranged in accordance with conventional bar code standards. Because of its limited precision, a UPC symbol may be used to identify a class of product rather than an individual product.

The first bar code 214a can be encoded with a 12-digit number. The first digit of the UPC symbol is a number system character (NSC). In some implementations, an NSC with a value of "5" is used as a coupon identifier to identify the bar code 214a as a coupon bar code. Similarly an NSC with a value of "99" also may be used if the coupon 200 is an in-store distributed coupon and has been requested by the retailer.

The five digits following the NSC is a GS1 company prefix. As shown in the example, "14141" is the company prefix associated with the manufacturer "Jemay". The company prefix is required on bar codes so that POS system can perform validation as to whether the product associated with the coupon was purchased.

The next "100" identifier indicates that the bar code 214a (i.e., the coupon 200) is for "Jemay soap" product. Other identifiers may be used if the coupon 200 only applies to a particular product or family of products. For example, a "101" identifier may be used in replace of the "100" identifier if the coupon 200 applies to only 8-ounce "Jemay" dish soap. As another example, a "102" identifier may be used in replace of the "100" identifier if the coupon 200 applies to only 4-ounce "Jemay" dish soap. As yet another example, if the coupon 200 is applicable towards "any" dish soap, including those of other brands or sub-brands, then a "200" identifier may be used. The two-digit "90" identifier indicates a redemption value of the coupon (i.e., $0.90) to be subtracted from the overall purchase price.

The second bar code 214b may be a UCC/EAN-128 coupon extended code. The second bar code 214b may provide other important or additional information that is not provided by the first bar code 214a. For example, the second bar code 214b includes the NSC of the company prefix of the product being purchased so as to identify an associated manufacturer. It may also include information such as an offer code an expiration date and/or a serial number/household identification number for the coupon.

The second bar code 214b can include one or more application identifiers to define a data architecture. An application identifier is a prefix code used to identify the meaning and the format of the data that follows the application identifier (e.g., data fields). Simply put, application identifiers determine the content of a wide range of information. Applications in which application identifiers are used can include identification numbers (e.g., product or individual identification), traceability numbers and dates (e.g., traceability of individual product or unit in a supply chain), quantities and measurements (e.g., logistical measurements for warehouse space management systems and transportation services), transaction references and location numbers (e.g., to facilitate the delivery, order, and invoice reconciliation process), and other types of information.

As shown, the second bar code 214b includes an application identifier ("8100"), which, in some applications, is the extended code for coupons. The second bar code 214b also includes a NSC prefix. Because two manufacturers may be assigned a same five-digit manufacturer number (e.g., at position 2-6), the NSC can serve to differentiate their identity. For example, manufacturer A may be assigned a NSC of "0", while manufacturer "B" may be assigned a NSC of "7". The second bar code 214b further may include a five-digit offer code ("54321") which indicates the type of offer being promoted by the coupon 200.

In some implementations, the second bar code 214b also may be presented in one or more (e.g., four other) different formats to convey additional information. For example, the second bar code 214b may be encoded with an application identifier, a NSC prefix, an offer code, an expiration date (e.g., 0101, which indicates an expiration date of January 2001). As another example, the second bar code 214b may be encoded with an application identifier, a GS1 prefix, an offer code, and a household identification number (e.g., "1234567"). In this example, the new household identification number may require a new application identifier (e.g., "21") so as to indicate that the data that follows the new application identifier represents the household identification number.

Bar codes generated by the bar code creation manager 345 may be stored in a bar code repository 120. The bar code repository 120 may be coupled to the user server 109 and the user repository 118 so that new and existing bar codes associated with a specific user may be stored and retrieved. The bar code repository 120 may store all previously generated bar codes and associated data for each bar code. The bar codes may be stored as, for example, text or images. The bar code repository 120 may suitably be updated on a periodic, scheduled or random basis by the main database system 106.

The bar code creation manager 345 may index and sort the bar codes stored in the bar code repository 120, and may utilize search technology to query and locate one or more bar codes based on the criteria specified by the business groups 102. For example, the bar code creation manager 106 may search and locate a family code matching the product specified by the user. If multiple matches are found, the bar code creation manager 106 may utilize other criteria including redemption value and company prefix to find a best matching bar code.

In some implementations, the bar code creation manager 345 may create a list that indicates all qualifying products that may be purchased using the created bar code. For example, assuming that the newly created bar code includes a family code of "670" which indicates that all "Brand X shampoos" are qualifying products, then the bar code creation manager 345 may enlist products including "Brand X—Silk Shampoo For Well Maintained Hair", "Brand X—Oil Shampoo For Greasy Hair", and "Brand X—Dry Shampoo For Dry Hair" as qualifying products.

In other implementations, the bar code creation manager 345 also may create a list that presents all products for which the created bar code is ineligible. Particularly, if the family code of the newly created bar code is a specific family code (e.g., a family code that does not end in a zero), the bar code creation manager 345 may provide two links that are accessible to the users. In these implementations, one link may provide user access to a listing of ineligible products associated with the summary code of the family code. As an example, if "111" is the family code of the newly generated bar code, a listing showing all ineligible products with the family codes "112" through "119" may be displayed. Another link also may be provided to provide access to a listing of ineligible products associated with the super summary code of the family code. For example, if "111" is the family code of the newly generated bar code, then the super summary code of the family code "111" includes family codes "101" through "109" and "112" through "199", and a listing showing all ineligible products with the family codes "101" through "109" and "112" through "199" may be displayed.

In yet other implementations, if the family code of the newly created bar code is a summary code (e.g., a family code that ends with one zero), the bar code creation manager 345 may enlist a catalog of products that fall outside the summary code. As an example, if the newly created bar code includes "110" as the family code, then the super summary code of the family code "110" includes family codes "101" through "109" and "121" through "199", and a listing showing all ineligible products with the family codes "101" through "109" and "121" through "199" may be displayed.

In yet other implementations, if the family code of the newly created bar code is a super summary code (e.g., a family code that ends with two zeros), the bar code creation manager 345 may compile only a single listing for user review. This listing may include all ineligible products that fall outside the super summary code. As an example, if the newly created bar code includes "100" as the family code, then a listing showing all ineligible products with the family codes "001" through "099" and "200" through "999" may be displayed (family Codes 001 through 009 and 990 through 999 are reserved by GS1 and cannot be used as family codes for products).

While the bar codes described in the aforementioned implementation utilize characters defined in accordance with the character specification of the Code 128 standard, other predefined bar codes, including Codabar, the EAN 8 and 13 series, the ISBN series, the ISSN series, ITF, the JAN 8 and 13 series, Pharmacode, the UPC-A and -E series, Plessy and Code 39 also are contemplated.

Further, the bar codes described above may utilize the new GS1-Databar. GS1 DataBar is a family of linear bar codes of composite symbols that includes symbols intended for retail POS scanning (e.g., GS1-DataBar Stacked, GS1 DataBar Expanded, GS1 DataBar Expanded Stacked) and symbols that are not intended for retail POS scanning (e.g., GS1 DataBar Truncated, GS1 DataBar Limited). These variants of the GS1 DataBar have the ability to encode additional data beyond a basic, short identifier that is usually printed with UCC bar codes.

In these implementations, the creation of a coupon based on bar codes using DataBar symbols may be accomplished by receiving an input from a user specifying a request to generate an "interim standard" coupon (i.e., a coupon with both UPC-A and DataBar symbols and does not include UCC/EAN-128 Extended). The user then may proceed to select a product and locate the correct family code for the product, which contains the GS1 company prefix and the value code. The user also may specify a second product and select an additional Company Prefix, purchase requirement and family code for the coupon if desired. The user also may specify a third Company Prefix, purchase requirement and locate a third family code for a third product.

All specified data may be saved and stored onto a spreadsheet type document, and the user may modify the spreadsheet document and enter additional data for the GS1 DataBar if desired. For example, the user may enter a primary GS1 company prefix, an offer code, a primary family code, a save value and a primary purchase requirement into the spreadsheet document. Other data that may be entered include, without limitation, a second and/or third GS1 company prefix, secondary family code and purchase quantity requirements, household identification number, retailer GS1 company prefix or GLN, start date and expiration date. The bar code creation manager 345 may automatically generate application identifiers based on the data input by the user, and may perform quality monitoring and verification on a periodic or random basis to ensure that the data entered by the user is consistent with the data represented by the GS1 DataBar symbol.

Example Process for Bar Code Creation

FIG. 5A is a flow diagram of an example process 500 for generating a bar code. The process 500 may be performed, for example, by the system 100, and for clarity of presentation, the description that follows uses these as the basis of examples for describing the process 500. However, another system, or combination of systems, may be used to perform the process 500.

As shown, the process 500 begins with receiving a bar code request (502). In response to the request, a graphical user interface (GUI) may be generated. The GUI may be operable to allow a user to interface with at least the main database system 106 (or the bar code creation manager 345) for any suitable purpose, such as creating a new bar code.

Generally, a GUI provides the particular user with an efficient and user-friendly presentation of data provided by or communicated within system 100. The GUI may comprise a plurality of customizable frames or views having interactive fields, pull-down lists, and buttons. In some implementations, if the user has previously registered with the main database system 106 and obtained a business account, the GUI may be operable to display all information associated with the business account in a user-friendly form. As an example, the GUI may display all brands and sub-brands associated with the user (e.g., Brand "X" and sub-brand "X-A"). As another example, the GUI may display all previously created bar codes, dates of creation and associated product(s) (e.g., bar codes "x-xxxxx-xxxxx-x" on Jan. 1, 2010 for Brand "X"). As yet another example, the GUI may display a list of products or families of products for which the previously requested bar codes are not applicable (e.g., bar codes "x-xxxxx-xxxxx-x" cannot be applied to Brand "Y"). The GUI may also present a plurality of portals or dashboards.

The GUI can be configurable, supporting a combination of tables and graphs (bar, line, pie, status dials, etc.), and may be able to build/process real-time data, including the number of bar codes currently stored, number of bar requests in queue, qualifying products or family of products for each and the like. It should be understood that the term graphical user interface may be used in the singular or in the plural to describe one or more graphical user interfaces and each of the displays of a particular graphical user interface. Indeed, reference to a GUI may indicate a reference to a front-end as well as the particular interface accessible via the advertisers, partners or publishers, as appropriate. Therefore, the GUI as discussed herein contemplates any graphical user interface, such as a generic web browser or touch screen, that processes information in system 100 and efficiently presents the results to the user.

In some implementations, to access the GUI, the user may login (e.g., via username and password) to access the user interface. The login may occur, for example, via a web page and the login process may use encryption, such as secure Hypertext Transfer Protocol (HTTPS).

The process 500 also includes determining one or more bar code parameters associated with the request (504). In one implementation, determining one or more bar code parameters may include determining a company prefix for which a bar code is to be generated. The company prefix may be a company prefix initially generated, assigned and validated by the GS1. In these implementations, a validation step also may be implemented to ensure that the company prefix is associated with the business account.

In another implementation, determining one or more bar code parameters may include receiving a family code. The family code may be supplied by the user. The family code may be different from products to products. The family code of a product may include a three-digit identifier that is completely different from the product number labeled on the product, since coupons can be redeemable on more than one size, color, or form of a particular branded product.

A family code on a coupon may be a super summary code having a value of "600" indicating that the coupon applies to all "Shampoo". As another example, a family code of a coupon may be a summary code having a value of "670" indicating that the coupon applies to only "Brand X Shampoo". As yet another example, a family code of a coupon may be a family code having a value of "681" indicating that the coupon applies to only "Brand X-12-ounce Shampoo", or a value of "682" indicating that the coupon applies to only "Brand X-18-ounce Shampoo".

The family code suggested for use on a coupon may be a "992 bypass family code". Manufacturers may adopt a "992 bypass family code" which commands a POS system to accept a coupon without validating against the Company Prefix on the coupon. The "992 bypass family code" can remove the necessity for checker intervention and allow scanning for value of the coupon only.

In yet another implementation, determining one or more bar code parameters may include specifying/determining a value code, which designates the redemption value of a coupon (e.g., in dollars and cents). A value code may be a direct representation of a face value. For example, a value code with a value of "10" represents a 10-cent coupon value. A value code also may not correspond with its redemption value. For example, a value code with a value of "14" indicates "a buy-one-get-one-free" promotion. As another example, a value code with a value of "61" indicates a coupon value of "$10.00".

Determining one or more bar code parameters may include determining a check digit for a bar code. The check digit is the last digit in the bar code which appears to the right of the bar code. The check digit may be calculated based on the NSC, Company Prefix, family code and value code, and may change if any of the previous field is modified.

Process 500 includes generating a bar code based on the one or more parameters (506). In some implementations, the bar code can be electronically sent by the bar code creation engine 345 (e.g., print engine 398) to the user submitting the bar code request, or may be stored as an electronic image file in the business account associated with the user for retrieval. In a more specific example, the image file may include a static image in any suitable format such as JPEG, TIFF, and GIFF. Additional information also may be included in each image file. For example, each image file may include the date on which the bar code was created, and the identification of the user (i.e., associated business account or company prefix) from whom the bar code request was received.

In some implementations, generating a bar code based on the one or more parameters may include requesting approval from a user. If the bar code is approved, a summary may be printed that describes each element of the bar code. For example, the summary may describe the family code "111" to include a family of "Brand X shampoo" products, and the value code as being "Buy-one-get-one free".

Example Process for Extended Bar Code Creation

Figure 5B:
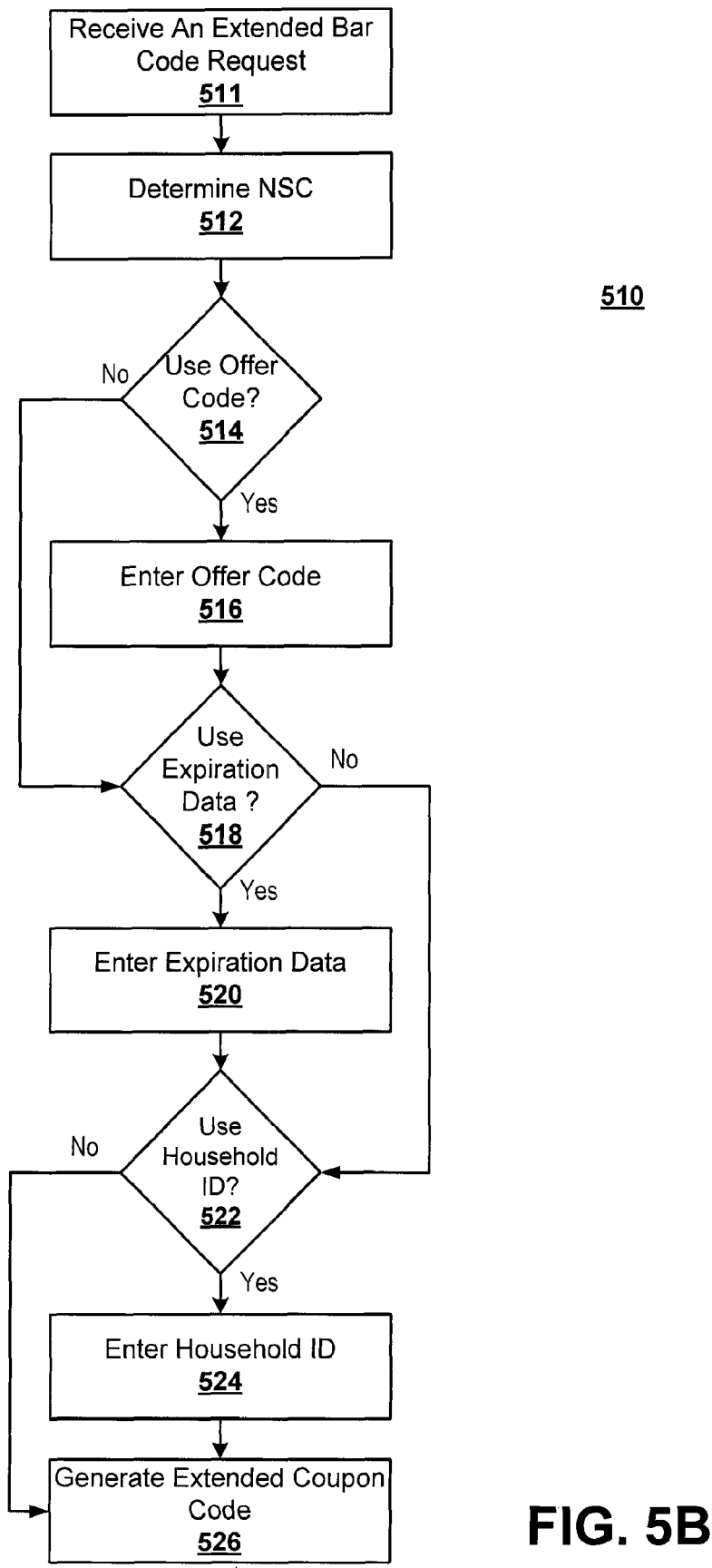
FIG. 5B is a flow diagram showing an example of an extended bar code creation process.

FIG. 5B is a flow diagram of an example process 510 for generating a bar code. Similar to the process 500 shown in FIG. 5A, the process 510 may be performed, for example, by the system 100, and for clarity of presentation, the description that follows uses these as the basis of examples for describing the process 510. However, another system, or combination of systems, may be used to perform the process 510.

Process 510 may begin with receiving an extended bar code request (511). In response to the request, a graphical user interface (GUI) may be generated. This GUI may be the same or different from the GUI generated in response to receiving a bar code request as discussed in FIG. 1. The GUI may be operable to allow a user to interface with at least the main database system 106 (or the bar code creation manager 345) for any suitable purpose, such as creating a new bar code.

Process 510 further includes determining a number system character (512). The number system character is determined by the number system character of the product being promoted. Next, process 510 determines whether an offer code is to be used (514). The offer code may be specified by the user requesting the extended bar code. If an offer code is desired ("Yes" branch of step 514), the offer code may be, for example, entered by the user (516). Otherwise ("No" branch of step 514), process 510 may proceed to determine whether an expiration date should be encoded for the extended bar code (518). If an expiration date is desired ("Yes" branch of step 518), the expiration data may be input, for example, by the user (520). Otherwise ("No" branch of step 518), process 510 proceeds to determine whether a household identification number should be encoded for the extended bar code (522). If a household identification is desired ("Yes" branch of step 522), the household identification may be, for example, entered by the user (524). Otherwise ("No" branch of step 522), process 510 proceeds to generate an extended bar code (526).

Example Process for Family Code Assignment Using Brands/Sub-Brands

Figure 5C:
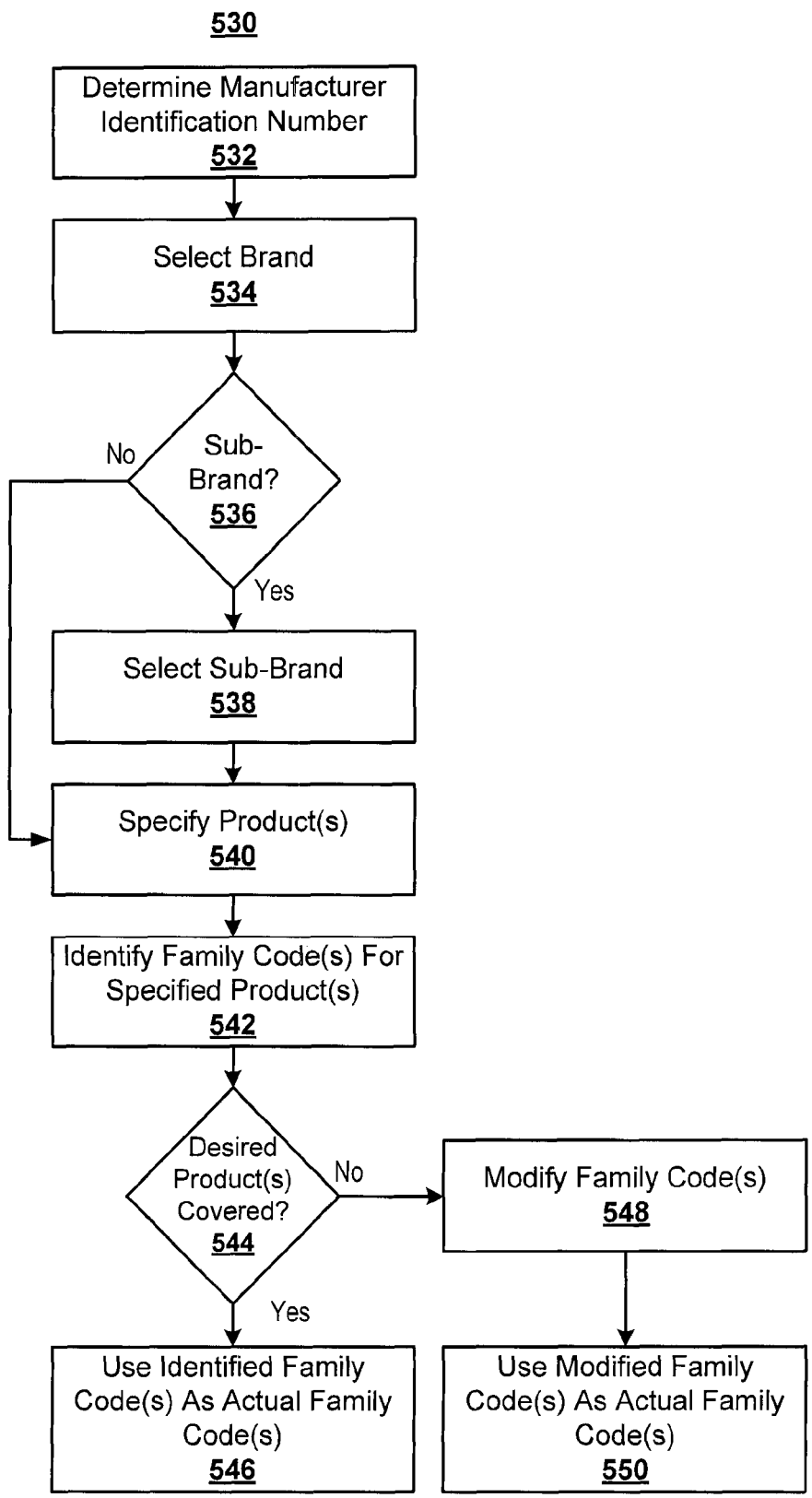
FIG. 5C is a flow diagram showing an example of a family code assignment process using brands and sub-brands.

FIG. 5C is a flow diagram of an example process 530 for assigning a family code based on brand and/or sub-brand. Similar to the processes 500 and 510 shown in FIGS. 5A and 5B, process 530 may be performed, for example, by the system 100, and for clarity of presentation, the description that follows uses these as the basis of examples for describing the process 530. However, another system, or combination of systems, may be used to perform the process 530.

Process 530 may begin with determining a company prefix and necessarily the identity of the requester (532). In some implementations, the company prefix may be assigned by the GS1. The company prefix is in the form of a numerical value. Based on the company prefix, the bar code creation manager 345 may automatically determine the identity of the user. The identity of the user may be used to retrieve an associated business account. The identity of the user also may be used to search and locate data previously entered by the user. If data associated with one or more brands for the user already exists, the user may simply select to add, modify or remove the one or more brands. If a brand has not been entered, the user may proceed to select or add a brand associated with a product or more than one brand for a family of products (534).

Process 530 further includes determining whether a sub-brand is to be used (536). If a sub-brand is to be used for more than one product ("Yes" branch of step 536), the user may proceed to select a sub-brand (538). Otherwise ("No" branch of step 536), process 530 proceeds with specifying one or more products (540). The products specified may be associated with a brand or brands. The products specified also may be associated with a sub-brand if such is selected. Based on the specified products, process 530 includes identifying one or more family codes for the specified products (542). For example, the bar code creation manager 345 may recommend "671" as the family code for "Brand X 12-ounce shampoo" and "678" as the family code for "Brand X 20-ounce shampoo". The user may review the proposed family codes to determine whether the desired product or family of products are covered by the proposed family codes (544). Should the user acknowledge that the proposed family codes cover the desired products ("Yes" branch of step 544), the proposed family codes are used as the actual family codes for the specified products (546). Else ("No" branch of step 544), the user may manually override the proposed family codes with new family codes (548), and the modified family code(s) may be used as the actual family code(s) (550).

Example Screen Shots

Described below are example instantiations of applications and environments in which bar codes can be created, presented or otherwise processed. Particular examples include a web instantiation in which bar codes are created within a desktop environment. Other instantiations are possible.

FIGS. 6A-6E are example screen shots showing an interface for generating an extended bar code.

Figure 6A:
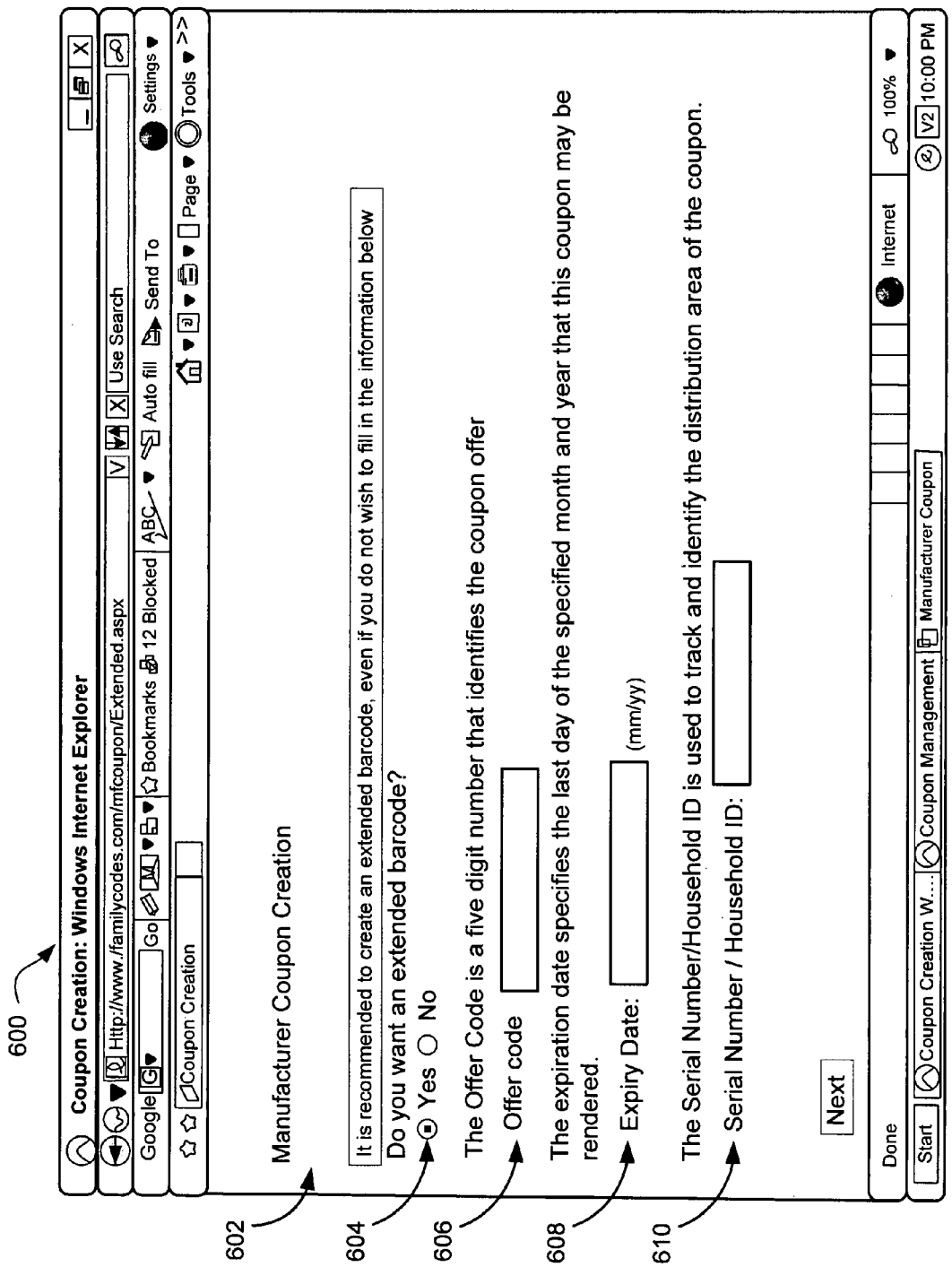
FIGS. 6A-6E are example screen shots showing an interface for generating a bar code that includes an extended bar code.

FIG. 6A is a screen shot 600 that shows an interface 602 displayed on a computer screen with a Microsoft Windows® application. A user may submit an extended bar code request by accessing the interface 602, and selecting the "Yes" button under the extended bar code request field 604. In some implementations, upon detecting the user selection to create an extended bar code, the interface 602 further displays an "Offer Code" field 606, an "Expiry Date" field 608, and "Serial Number/Household ID" field 610.

Figure 6B:
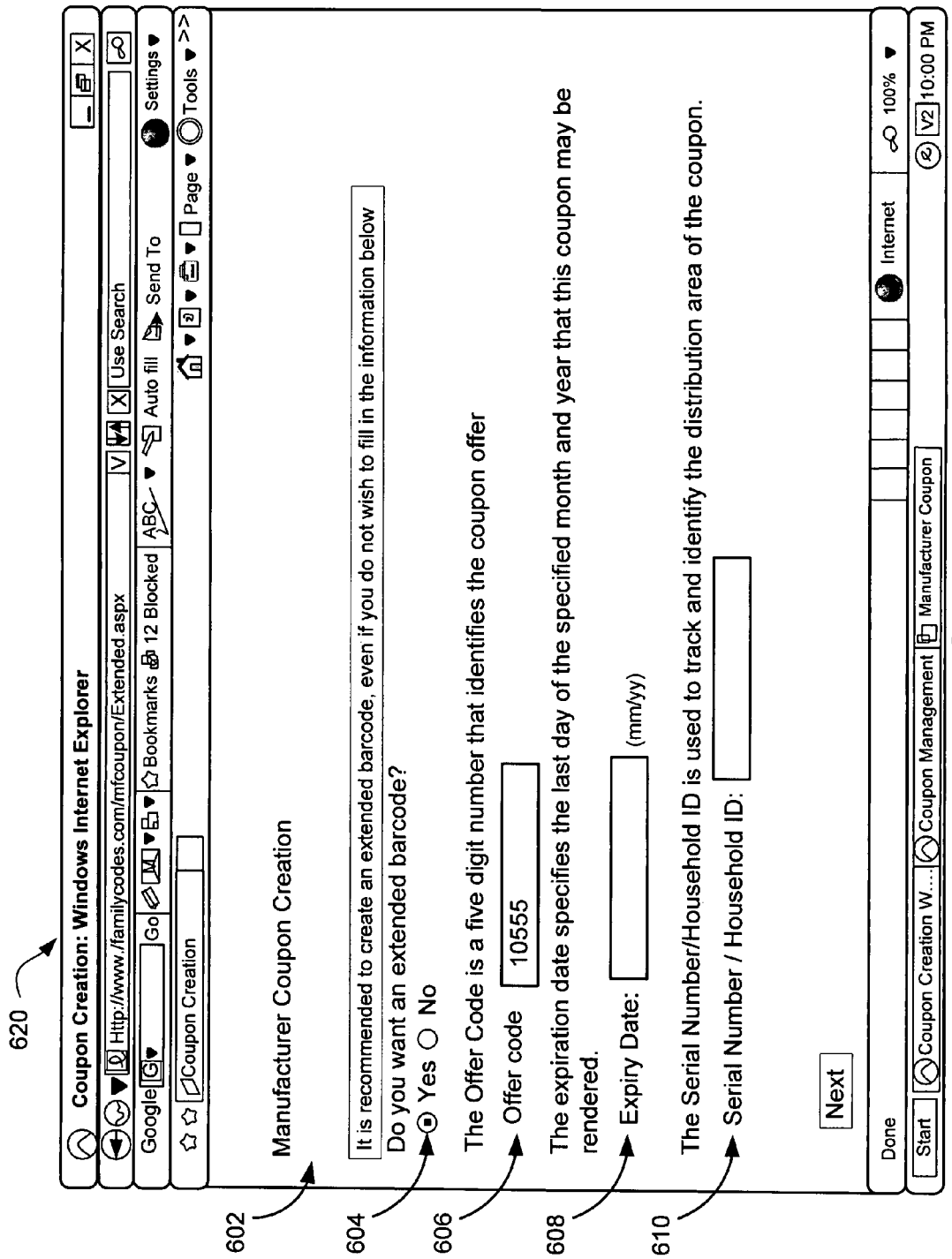

FIG. 6B is a screen shot 620 showing an offer code "10555" being input into the "Offer Code" field 606. The offer code "10555" may be a user-specified value. Alternatively, the offer code "10555" may be generated by the offer code engine 390. For example, a user may first create a table of values each corresponding to an offer type. As an example, the user may specify within the table that the offer code "10001" associates with the New York metropolitan area. Then, the offer code engine 390 may automatically select the offer code "10001" if the coupon is to be distributed within the New York metropolitan area.

Figure 6C:
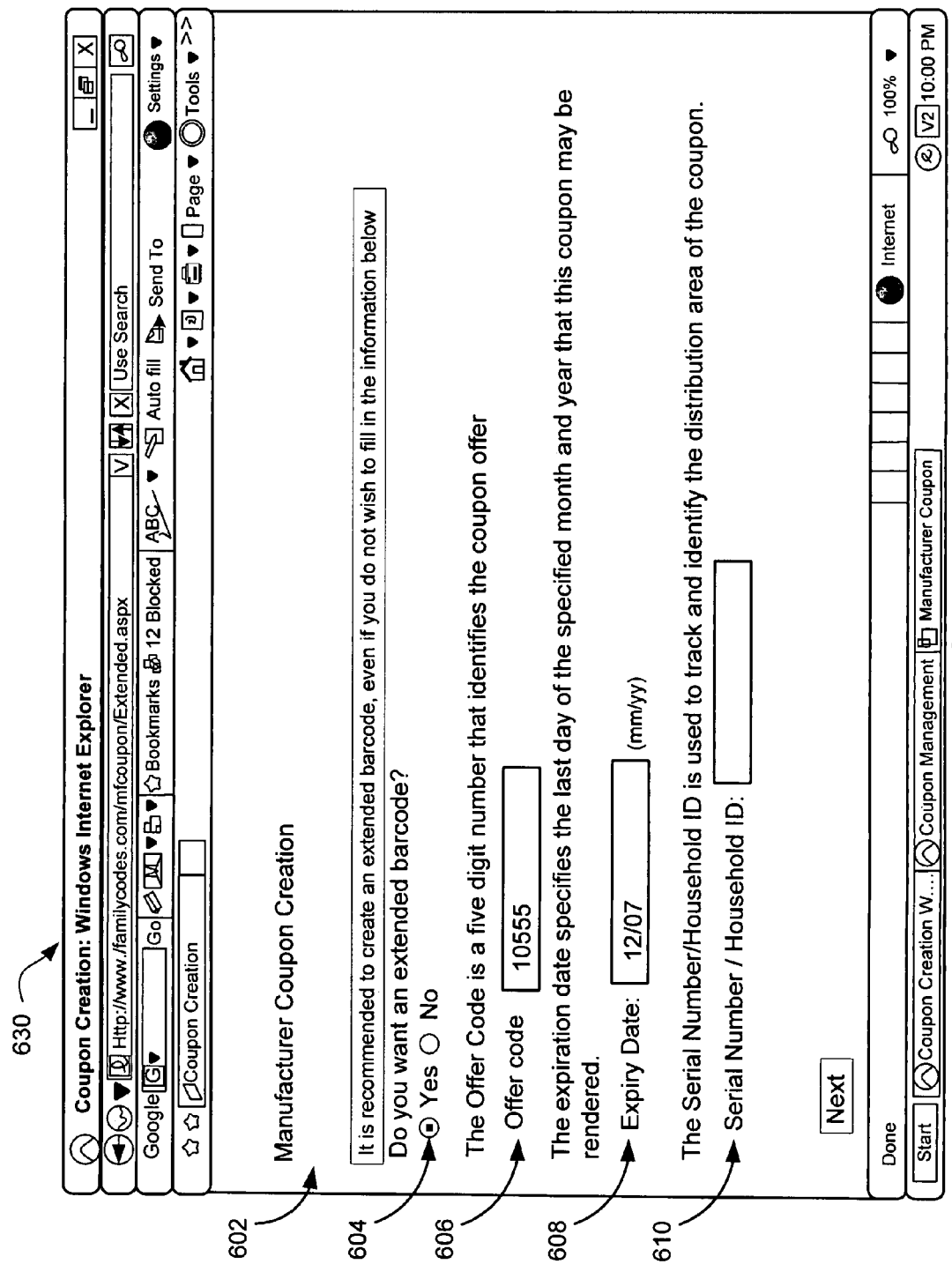
Figure 6D:
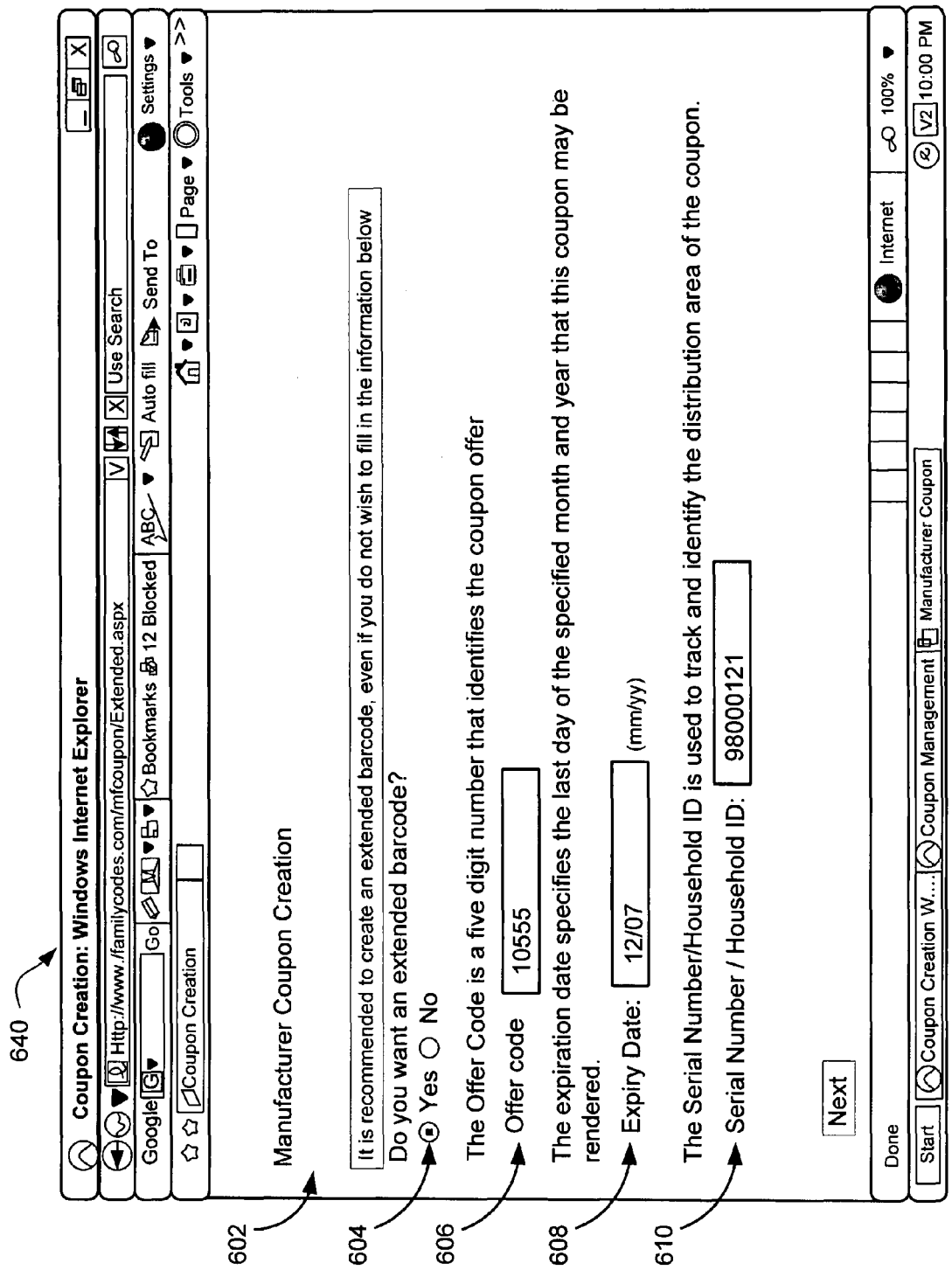

FIG. 6C is a screen shot 630 showing an expiration date of "12/07" being input into the "Expiry Date" field 608. The value specified in the "Expiry Date" field 608 specifies the expiration date of an coupon offer being promoted. FIG. 6D is a screen shot 640 showing a household identification number "98000121" being input into the "Serial Number/Household ID" field 610. The value of the serial number or household identification number may be manually entered by the user, assigned by retailers or marketers, or alternatively, generated by, for example, the house identification engine 396 based on one or more statistic data associated with the user. The information used for the statistics may be solicited, for example, from the user's business account. The information may include, for example, geographic location, occupation, education, number of household members, age, gender, other demographic data, number of computers owned by the user, type of Internet access (e.g., cable, modem, DSL, etc.) used by the user and the like.

It should be noted that the offer code, the expiration date and the serial number/household identification number are optional, and a user may bypass entering any one or all of such data. It should also be understood that other data such as application identifiers may be automatically generated (e.g., by the application identification engine 392) without user intervention.

Figure 6E:
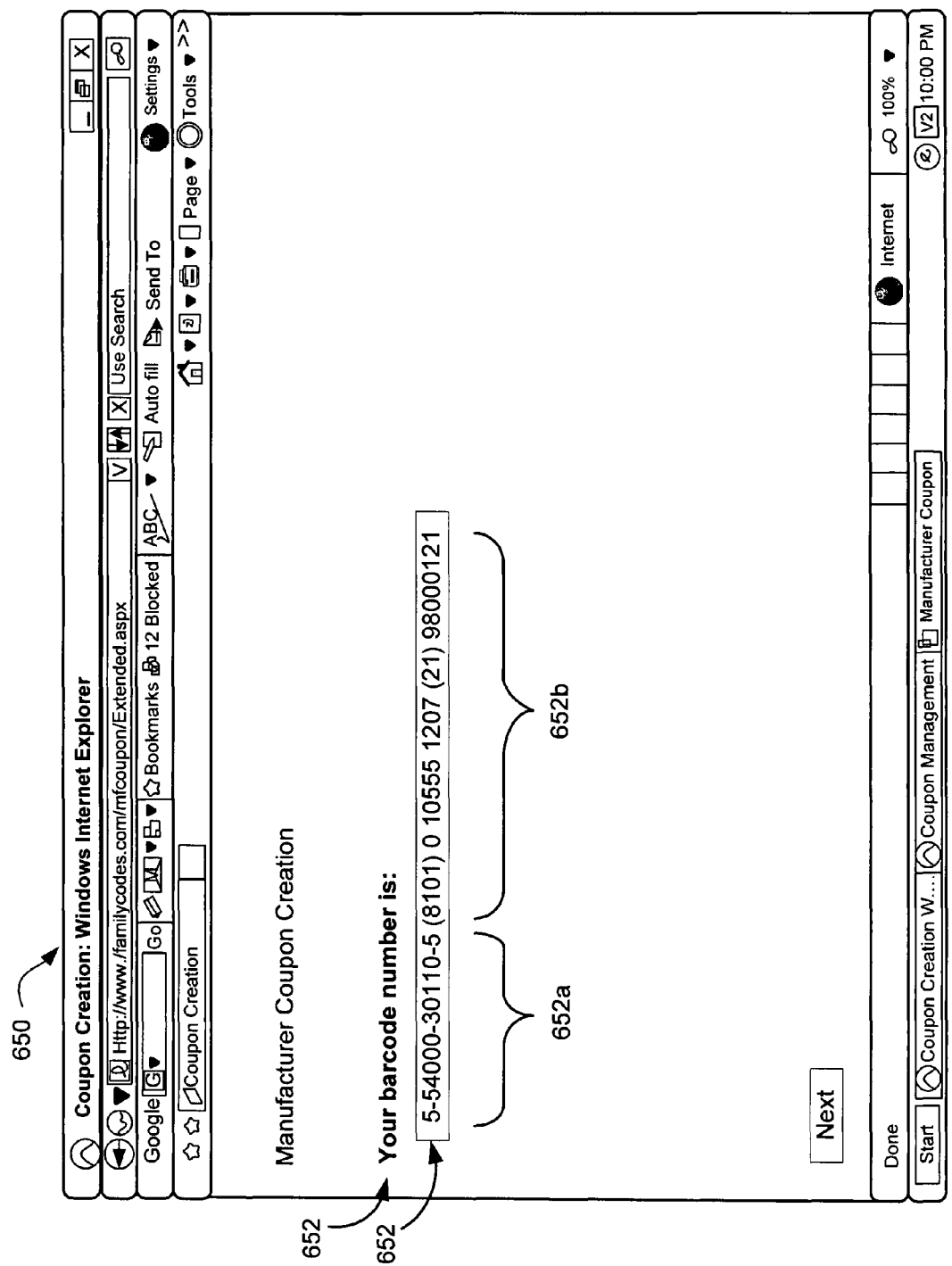

FIG. 6E is a screen shot 650 showing a bar code 652 under the bar code field 652. The bar code 652 includes a UCC coupon bar code 652 having a value of "5-54000-30110-5" and EAN-128 extended bar code 652b having a value of "8101-0-10555-1207-21-98000121". As shown, the extended bar code 652b further generates, without user intervention, an application identifier "8100", which identifies the extended bar code as a coupon extended code that includes a number system character and an offer code, and an application identifier "21", which indicates a serial number or household identification number is to be followed. Of course, other application identifiers also may be used, such as "8101" if the extended bar code includes a number system character, an offer code and an end of offer code, or "8102" if the number system character of the extended bar code is preceded by "0". The number system character "0" may be generated by the number system character engine 380, which identifies the type of manufacturer or how the bar code will be used. For example "0", "6" and "7" are generally used for retail-related manufacturers, while "3" is assigned to the health and drug manufacturing industries.

FIGS. 7A-7C are example listings showing brands and sub-brands that an authorized user may access.

FIG. 7A shows a listing 700 that includes company prefix "012345" and company prefix "712345". Each company prefix identifies a particular user (or manufacturer), and one or more brands 702 may be defined under each company prefix. Generally, the one or more brands may be accessed only by users who are associated with the company prefix by which the brands are defined. For example, assuming that company prefix "012345" is assigned to company "A", then only company "A" has access to "Brand Alex", "Brand Betty" and "Brand Charles". Similarly, assuming that company prefix "712345" is assigned to company "B", then only company "B" has access "Brand John", "Brand Jim" and "Brand Jeff".

Each brand 702 may include one or more sub-brands 704 (or categories). As indicated in the listing 710 shown in FIG. 7B, "Brand Alex" includes four sub-brands. The sub-brands includes "Alex Light", "Alex Ultra", "Alex Supreme" and "Alex Thin Crust". Similarly, "Brand Charles" includes four sub-brands, which includes "Charles Pizza", "Charles Pizza Rolls" and "Charles Desserts". To provide suitable viewing of the brands and sub-brands, users may collapse or expand any brand or sub-brand as desired using box 706.

Each sub-brand 704 may include one or more associated products, and each product may be supplemented with a UCC bar code, a description of the product, a size of the product and a family code of the product. As indicated in the listing 720 shown in FIG. 7C, sub-brand "Alex Light" includes four products 721a-d. A bar code 722 is assigned to each product. For example, bar code "012545 00011" is assigned to product 721a, while bar code "012345 00012" is assigned to product 721b.

Each product may include a primary description 724. For example, product 721a includes a description of "Turkey Pepperoni Pizza", product 721b includes a description of "Vegetarian Pizza", product 721c includes a description of "Cheese Pizza", and product 721d includes a description of "BBQ Chicken Pizza". If desired, a second description 726 also may be added to describe each product. As an example, the size of each product (e.g., 12 oz, 15 oz, etc.) also may be displayed to the user.

Each product also may include a family code 728. The family code 728 may be generated using the methods described in FIG. 5C. In some implementations, a family code may be suggested by the bar code creation manager 345. The bar code creation manager 345 may display a list of qualifying products that may be purchased using the suggested family code as well as a list of ineligible items. FIGS. 8A-8F are example screen shots showing a process for generating a suggested family code.

Referring to FIG. 8A, a user may select products associated with multiple brands for which a suggested family code is desired. As shown on the list 800, the user has selected eight products from "Brand Alex" (i.e., "Turkey Pepperoni Pizza", "Vegetarian Pizza", "Cheese Pizza" and "BBQ Chicken Pizza" of sub-brand "Alex Light", "Tomato & Basil Pizza" and "Ham & Pineapple Pizza" of sub-brand "Alex Ultra", "Deluxe Pizza" and "Meat Lovers Pizza" of sub-brand "Alex Supreme") and three products from "Brand Charles" (i.e, "Pepperoni Pizza", "Sausage Pizza" and "Cheese Pizza" of sub-brand "Charles Pizza"). To request a suggested family code, the user may navigate a cursor 804 over the "Suggest Family Code" button 802 to select the "Suggest Family Code" button 802. After the "Suggest Family Code" button 802 is selected, a suggested family code is generated.

Family code engine 382 may receive a user's selection of the "Suggest Family Code" button 802, and evaluate the family codes of the selected products to determine a suggested family code that is suitable for all desired products. As shown in FIG. 8B, the suggested family code is "200", which indicates that all of the selected products may be purchased with a coupon having a family code of "200". It should be noted that even though the products associated with the sub-brand "Alex Thin Crust" have not been selected, the suggested family code "200" is still applicable for purchasing of products associated with the sub-brand "Alex Thin Crust". If desired, the user may select the type of the suggested family code to be generated. For example, the user may select to generate a suggested summary code or a suggested super summary code.

A user may de-select one or more products to re-generate a new suggested family code. As shown in FIG. 8C, the user has de-selected all products of "Brand Charles". The user may request a new suggested family code by placing the cursor 804 over the "Suggest Family Code" button 802. As a result, a new suggested family code "210" is generated, as shown in FIG. 8D. Again, the new suggested family code "210" is still applicable for purchasing of products associated with the sub-brand "Alex Thin Crust" even though products associated with the sub-brand "Alex Thin Crust" have not been selected.

A user also may request to view products within the corresponding company prefix that cannot be purchased using the suggested family code. As shown in FIG. 8E, the user may navigate the cursor 804 over the "Outside Summary Code" button 806 to select the "Outside Summary Code" button 806. After the "Outside Summary Code" button 806 is selected, a listing 810 of ineligible products is displayed. As shown in FIG. 8F, the listing 810 includes sub-brand "Charles Desserts" which includes four ineligible products ("Tiramisu", "Chocolate Cake", "Cheery Pie" and "Vanilla Cake"). As shown, each of the ineligible products can only be purchased using super summary code "300" or summary code "320".

Hardware System

Figure 4:
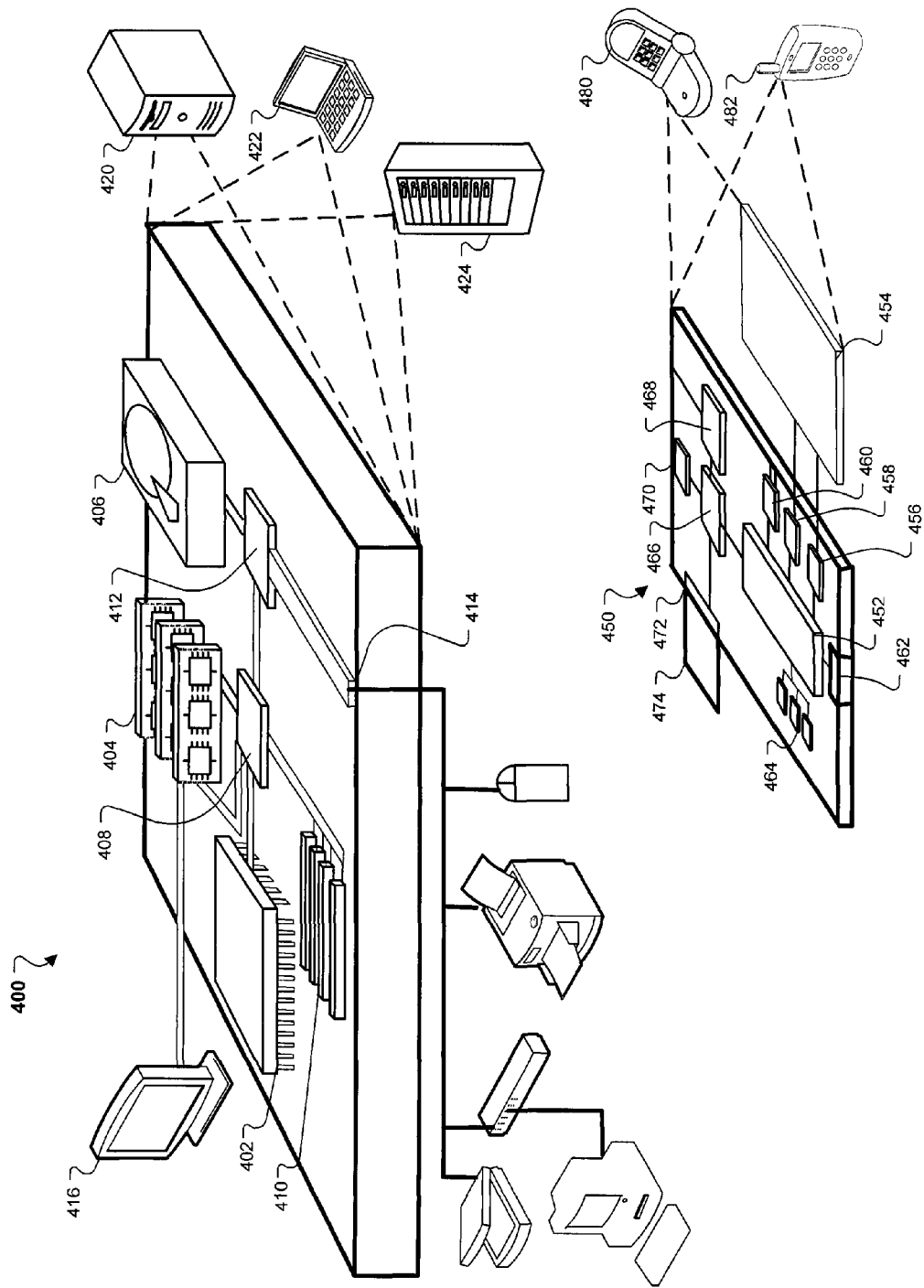
FIG. 4 is a block diagram illustrating an example hardware system.

FIG. 4 is a block diagram of computing devices and systems 400 and 450. The devices and systems 400 and 450 can be used for the operations described in association with the processes and implementations described above. For example, the devices and systems 400 and 450 may be included in either or all of the main database system 106, client system 104 and/or the business group systems 102.

Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and can be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses can be used, as appropriate, along with multiple memories and types of memory. Also, multiple computing devices 400 can be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which can accept various expansion cards (not shown). In the implementation, low-speed controller 412 is coupled to storage device 406 and low-speed expansion port 414. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 400 can be implemented in a number of different forms, as shown in the figure. For example, it can be implemented as a standard server 420, or multiple times in a group of such servers. It can also be implemented as part of a rack server system 424. In addition, it can be implemented in a personal computer such as a laptop computer 422. Alternatively, components from computing device 400 can be combined with other components in a mobile device (not shown), such as device 450. Each of such devices can contain one or more of computing device 400, 450, and an entire system can be made up of multiple computing devices 400, 450 communicating with each other.

Computing device 450 includes a processor 452, memory 464, an input/output device such as a display 454, a communication interface 466, and a transceiver 468, among other components. The device 450 can also be provided with a storage device, such as a microdrive or other device, to provide additional storage. Each of the components 450, 452, 464, 454, 466, and 468, are interconnected using various buses, and several of the components can be mounted on a common motherboard or in other manners as appropriate.

The processor 452 can process instructions for execution within the computing device 450, including instructions stored in the memory 464. The processor can also include separate analog and digital processors. The processor can provide, for example, for coordination of the other components of the device 450, such as control of user interfaces, applications run by device 450, and wireless communication by device 450.

Processor 452 can communicate with a user through control interface 458 and display interface 456 coupled to a display 454. The display 454 can be, for example, a TFT LCD display or an OLED display, or other appropriate display technology. The display interface 456 can comprise appropriate circuitry for driving the display 454 to present graphical and other information to a user. The control interface 458 can receive commands from a user and convert them for submission to the processor 452. In addition, an external interface 462 can be provide in communication with processor 452, so as to enable near area communication of device 450 with other devices. External interface 462 can provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 can also be provided and connected to device 450 through expansion interface 472, which can include, for example, a SIMM card interface. Such expansion memory 474 can provide extra storage space for device 450, or can also store applications or other information for device 450. Specifically, expansion memory 474 can include instructions to carry out or supplement the processes described above, and can include secure information also. Thus, for example, expansion memory 474 can be provided as a security module for device 450, and can be programmed with instructions that permit secure use of device 450. In addition, secure applications can be provided via the SIMM cards, along with additional information, such as placing identifying information on the SIMM card in a non-hackable manner.

The memory can include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal.

Device 450 can communicate wirelessly through communication interface 466, which can include digital signal processing circuitry where necessary. Communication interface 466 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 468. In addition, short-range communication can occur, such as using a Bluetooth, WiFi, or other such transceiver (not shown). In addition, GPS receiver module 470 can provide additional wireless data to device 450, which can be used as appropriate by applications running on device 450.

Device 450 can also communicate audibly using audio codec 460, which can receive spoken information from a user and convert it to usable digital information. Audio codex 460 can likewise generate audible sound for a user, such as through a speaker, e.g., in a handset of device 450. Such sound can include sound from voice telephone calls, can include recorded sound (e.g., voice messages, music files, etc.) and can also include sound generated by applications operating on device 450.

The computing device 450 can be implemented in a number of different forms, as shown in the figure. For example, it can be implemented as a cellular telephone 480. It can also be implemented as part of a smartphone 482, personal digital assistant, or other similar mobile device.

Where appropriate, the systems and the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications can be made without departing from the spirit and scope of the described implementations. For example, elements of one or more implementations may be combined, deleted, modified, or supplemented to form further implementations. As another example, a database server or repository need not perform all, or any, of the functionality attributed to that database server or repository in the implementations described above, and all or part of the functionality attributed to one repository may be performed by another database server or repository, another additional module, or not performed at all. As yet another example, the operations or steps recited in the foregoing flow charts can be performed in a different order and still achieve desirable results. As yet another example, users may have options of opting-in to an email service which will alert the users to new products carrying new bar codes not stored in the bar code repository 102. In this implementations, the bar code creation manager 345 or the main database system 106 may be in communication with retailers item files so that bar codes that do not exist in the bar code repository can immediately be recognized. Users may automatically be notified and asked to enter information associated with the new bar codes (e.g., correct Brand, Sub-Brand/Category, description, size and family code) into the bar code repository 120. Alternatively, users may also opt to have a third party to maintain this information or bar codes stored in the bar code repository 120. Accordingly, other implementations are within the scope of the following claims.

What is claimed is:

1. A method comprising:
receiving user input representing a user selection of two or more brands or products by selecting at least a bar code number, in a graphical user interface, for a plurality of products, wherein the user input does not specify family codes for the products;
receiving a request to generate one suggested family code for the plurality of products as a group;
wherein the plurality of products as a group does not yet have a suggested family code applicable to all the products in the plurality;
determining an existing individual family code for each product in the plurality of products;
generating, by a processor, the suggested family code based on each determined individual family code for each product, by selecting a value that is rounded off to a most significant digit that is common to all the determined individual family codes for all products in the plurality of products; and
generating bar code data for a coupon that identifies each of the plurality of products as a group based, at least in part, on the suggested family code;
wherein the method is performed by one or more computing devices.

2. The method of claim 1, wherein generating bar code data further includes generating the bar code data using a number system character and an application identifier.

3. The method of claim 1, further comprising:
displaying one or more ineligible products for which the suggested family code is inapplicable.

4. The method of claim 1, further comprising:
wherein receiving the user input includes data representing selecting a sub-brand associated with the brand name, wherein the determining includes identifying the plurality of products and associated brand or the sub-brand.

5. A system comprising:
a processor;
a computer-readable medium operatively coupled to the processor and including instructions, which, when executed by the processor, causes the processor to perform operations comprising:
receiving user input representing a user selection of two or more brands or products by selecting at least a bar code number, in a graphical user interface, for a plurality of products, wherein the user input does not specify family codes for the products;
receiving a request to generate a suggested family code for the plurality of products as a group;
wherein the plurality of products as a group does not yet have a suggested family code applicable to all the products in the plurality;
determining an existing individual family code for each product in the plurality of products by selecting a value that is rounded off to a most significant digit that is common to all the determined individual family codes for all products in the plurality of products;
generating the suggested family code based on each determined individual family code for each product; and
generating bar code data for a coupon that identifies each of the plurality of products as a group based, at least in part, on the suggested family code.

6. A computer-readable medium having instructions stored thereon, which, when executed by a processor, causes the processor to perform operations comprising:
receiving user input representing a user selection of two or more brands or products by selecting at least a bar code number in a graphical user interface, for a plurality of products, wherein the user input does not specify family codes for the products;
receiving a request to generate a suggested family code for the plurality of products as a group;
wherein the plurality of products as a group does not yet have a suggested family code applicable to all the products in the plurality;
determining an existing individual family code for each product in the plurality of products by selecting a value that is rounded off to a most significant digit that is common to all the determined individual family codes for all products in the plurality of products;
generating the suggested family code based on each determined individual family code for each product; and
generating bar code data for a coupon that identifies each of the plurality of products as a group based, at least in part, on the suggested family code.

7. The method of claim 1, wherein the plurality of products are associated with different brands.

8. The method of claim 7, wherein the plurality of products further are associated with different sub-brands.

9. A method comprising:
displaying in a graphical user interface one or more brands and related sub-brands, each sub-brand being associated with one or more products each having a corresponding existing family code, including displaying bar code numbers and product descriptions for the products in association with the brands and sub-brands;
wherein the one or more products does not yet have a suggested family code applicable to all the products as a group;
receiving user input representing selecting one or more brands or sub-brands among the displayed brands and sub-brands by selecting at least a bar code number in a graphical user interface, for a plurality of products, wherein the user input does not specify family codes for the products;
determining the existing family codes associated with individual products in a group of products that have the selected one or more brands or sub-brands by selecting a value that is rounded off to a most significant digit that is common to all the determined individual family codes for all products in the plurality of products; and
generating, by a processor, a suggested family code for the group of products that have the selected one or more brands or sub-brands based on the existing family codes associated with the individual products in the group
wherein the method is performed by one or more computing devices.

10. The method of claim 9, further comprising: generating bar code data for the one or more selected brands or sub-brands using the suggested family code.

11. The method of claim 9, further comprising:
identifying, from user input, one or more products to de-select from the group of products;
removing the one or more de-selected products from the group of products; and
generating a new suggested family code to be associated with the remaining group of products based on the determined family code associated with individual products remaining in the group of products.

12. The method of claim 10, further comprising:
generating coupon data for a product associated with one or more of the selected brands or sub-brands including applying the suggested family code onto the coupon.

13. The method of claim 10, where generating bar code data for a coupon that identifies each product remaining in the group based, at least in part, on the suggested family code.

14. The method of claim 13, where generating the bar code data includes generating the bar code data using GS-1 Databar symbols.

15. The method of claim 9, further comprising:
determining whether the suggested family code covers a desired group of products associated with the one or more of the selected brands or sub-brands; and
overriding the suggested family code based on a user input if the suggested family code does not cover the desired group of products.

16. The method of claim 9, further comprising:
generating a list of one or more products that fall outside the suggested family code.

17. The method of claim 9, further comprising:
identifying at least one brand or sub-brand that has been de-selected; determining a family code associated with the de-selected brand or sub-brand; and associating the suggested family code with the de-selected brand or sub-brand if the family code associated with the de-selected brand or sub-brand is related to the family code of the selected brands or sub-brands.

18. The system of claim 5, wherein the instructions that cause generating the bar code data further comprise instructions which when executed cause generating the bar code data using a number system character and an application identifier.

19. The system of claim 5, further comprising instructions which when executed cause displaying one or more ineligible products for which the suggested family code is inapplicable.

20. The system of claim 5, wherein the instructions that cause receiving the user input include instructions that cause receiving data representing selecting a sub-brand associated with the brand name, and the instructions for determining include instructions for identifying the plurality of products and associated brand or the sub-brand.

21. The system of claim 5, wherein each of the plurality of the products is associated with a different brand.

22. The system of claim 21, wherein each of the plurality of products is associated with a different sub-brand.

23. The computer-readable medium of claim 6, wherein the instructions that cause generating the bar code data further comprise instructions which when executed cause generating the bar code data using a number computer-readable medium character and an application identifier.

24. The computer-readable medium of claim 6, further comprising instructions which when executed cause displaying one or more ineligible products for which the suggested family code is inapplicable.

25. The computer-readable medium of claim 6, wherein the instructions that cause receiving the user input include instructions which when executed cause receiving data representing selecting a sub-brand associated with the brand name, and the instructions for determining include instructions for identifying the plurality of products and associated brand or the sub-brand.

26. The computer-readable medium of claim 6, wherein each of the plurality of the products is associated with a different brand.

27. The computer-readable medium of claim 26, wherein each of the plurality of products is associated with a different sub-brand.

* * * * *